(12) United States Patent
Lee

(10) Patent No.: US 12,561,691 B2
(45) Date of Patent: Feb. 24, 2026

(54) DEVICE SUPPORTING FINANCIAL SERVICES, AND INTEGRATED SYSTEM THEREFOR

(71) Applicant: Jong-Myung Lee, Seoul (KR)

(72) Inventor: Jong-Myung Lee, Seoul (KR)

( * ) Notice: Subject to any disclaimer, the term of this patent is extended or adjusted under 35 U.S.C. 154(b) by 52 days.

(21) Appl. No.: 18/692,387

(22) PCT Filed: Oct. 14, 2021

(86) PCT No.: PCT/KR2021/014260
§ 371 (c)(1),
(2) Date: Mar. 15, 2024

(87) PCT Pub. No.: WO2023/063449
PCT Pub. Date: Apr. 20, 2023

(65) Prior Publication Data
US 2024/0386432 A1 Nov. 21, 2024

(30) Foreign Application Priority Data

Oct. 13, 2021 (KR) ........................ 10-2021-0136078

(51) Int. Cl.
*G06Q 20/42* (2012.01)
*G06Q 20/32* (2012.01)
*G06Q 40/04* (2012.01)

(52) U.S. Cl.
CPC ....... *G06Q 20/425* (2013.01); *G06Q 20/3274* (2013.01); *G06Q 40/04* (2013.01);
(Continued)

(58) Field of Classification Search
CPC .. G06Q 20/425; G06Q 20/3274; G06Q 40/04; G06Q 20/02; G06Q 20/065;
(Continued)

(56) References Cited

U.S. PATENT DOCUMENTS 8,798,987 B2 * 8/2014 McLaughlin et al. ............ 704/4
11,170,450 B1 * 11/2021 Magoon et al. ....... G06G 40/08
(Continued)

FOREIGN PATENT DOCUMENTS

KR 10-2012-0129389 A 11/2012
KR 10-1572867 B1 11/2015
(Continued)

OTHER PUBLICATIONS

N. Munjal and R. Moona, "Secure and cost effective transaction model for financial services,"2009 International Conference on Ultra Modern Telecommunications & Workshops, St. Petersburg, Russia, 2009, pp. 1-6. (Year. 2009).*
(Continued)

*Primary Examiner* — Bennett M Sigmond
*Assistant Examiner* — George N. Proios
(74) *Attorney, Agent, or Firm* — Sughrue Mion, PLLC

(57) ABSTRACT

Provided is a device supporting financial services, and an integrated system that incorporates technologies such as QR codes, blockchain, distributed finance (DeFi), non-fungible tokens (NFT), and metaverse into financial services. Furthermore, the present disclosure relates to a method and a device for providing blockchain-based financial services and, more particularly, to a method and a device for providing services of making a payment or exchanging money through blockchain-based cryptocurrency that is performed in real time without a delay in processing time. Further, the present invention relates to: an ATM device that determines forgery/falsification of an ID card in an account opening process and authenticates the identity of an ID card holder by comparing the face of the ID card holder with the face of a photo of the ID card; and an operating method therefor. Moreover, the present disclosure relates to an electronic access management system using QR codes.

10 Claims, 8 Drawing Sheets

(52) U.S. Cl.
CPC ....... *G06Q 40/0421* (2025.08); *G06Q 40/045* (2025.08); *G06Q 40/046* (2025.08); *G06Q 40/053* (2025.08)

(58) Field of Classification Search
CPC ........... G06Q 20/3224; G06Q 2220/00; G06Q 20/18; G06Q 20/36; G06Q 20/381; G06Q 20/401; G06Q 20/4014; G06Q 20/40145; G06Q 20/4015; G06Q 40/02; G06Q 40/03; G06Q 40/08; G06Q 50/265; G06Q 2220/16; G06N 20/00; G06K 19/06; G06K 19/06037; G06V 10/10; G06V 10/17; G07C 9/29; G07F 7/08; G07F 17/40; G07F 19/20; G07F 19/207; G06F 21/31; H04L 9/50
USPC ......................................................... 705/44
See application file for complete search history.

(56) References Cited

U.S. PATENT DOCUMENTS

| | | | | |
|---|---|---|---|---|
| 12,450,666 | B2 * | 10/2025 | Yang et al. ............ | G06Q 40/08 |
| 2015/0088746 | A1 * | 3/2015 | Hoffman .......... | G06Q 20/40145 |
| 2015/0142659 | A1 * | 5/2015 | Shi ..................... | G06Q 20/3226 |
| 2015/0356555 | A1 * | 12/2015 | Pennanen .......... | G06Q 20/3829 |
| 2019/0147532 | A1 * | 5/2019 | Singh et al. ........... | G06Q 40/04 |
| 2020/0126058 | A1 * | 4/2020 | Mars et al. .......... | G06Q 20/327 |
| 2020/0364404 | A1 * | 11/2020 | Priestas et al. ....... | G06F 40/284 |
| 2021/0390545 | A1 * | 12/2021 | Martinez-Guarneros et al. ......... | G06Q 20/407 |
| 2023/0410211 | A1 * | 12/2023 | Chehrazi et al. ...... | G06Q 40/08 |
| 2024/0161204 | A1 * | 5/2024 | Bien et al. ............. | G06Q 40/08 |

FOREIGN PATENT DOCUMENTS

| | | |
|---|---|---|
| KR | 10-2193988 B1 | 12/2020 |
| KR | 10-2021-0083306 A | 7/2021 |

OTHER PUBLICATIONS

Siamak Solat, Security of Electronic Payment Systems: A Comprehensive Survey, Jan. 17, 2017. Cryptography and Security (cs.CR), https://arxiv.org/abs/1701.04556v1. (Year. 2017).*

International Search Report issued Jul. 8, 2022 in International Application No. PCT/KR2021/014260.

* cited by examiner

【FIG. 1】
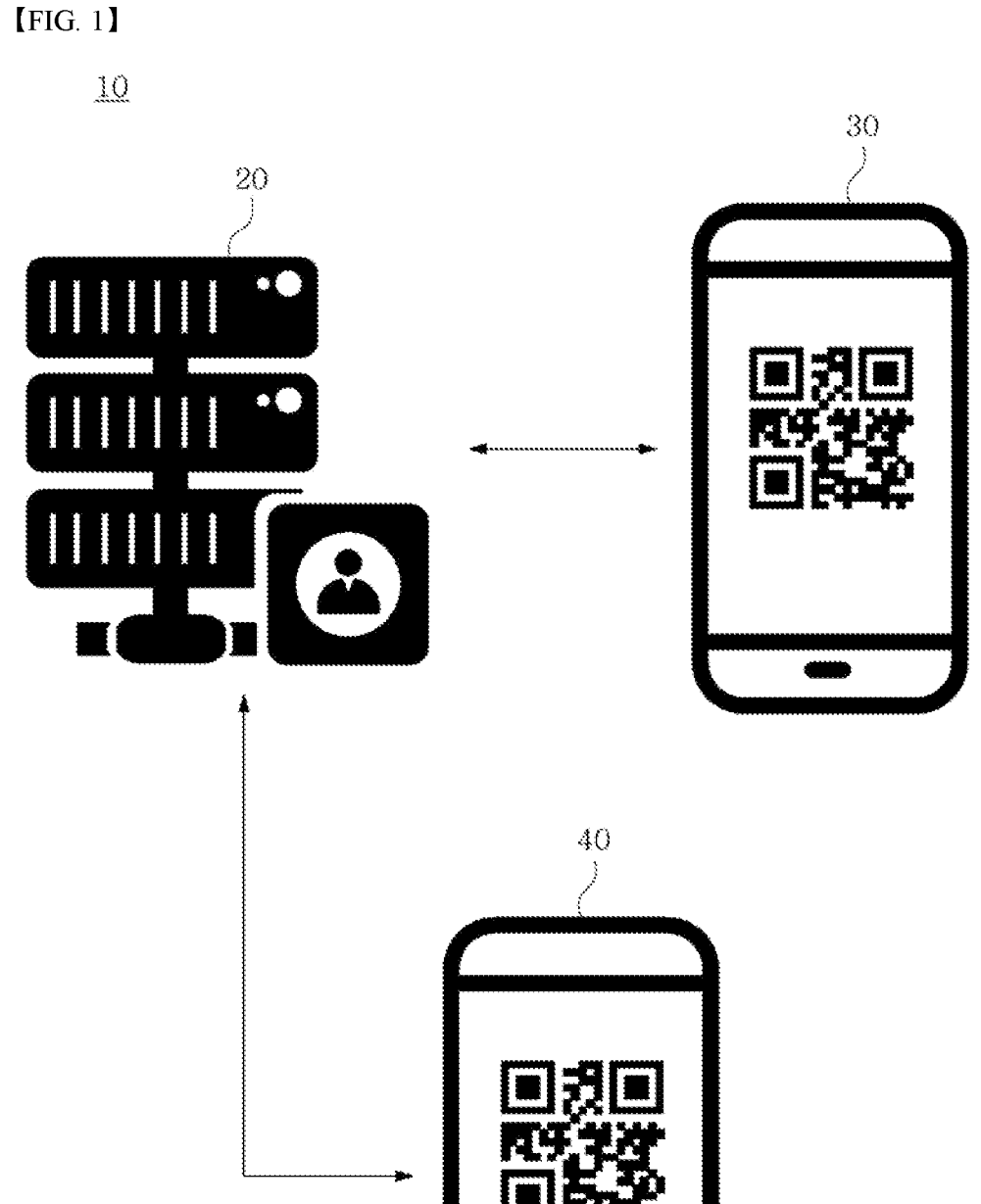

【FIG. 2】
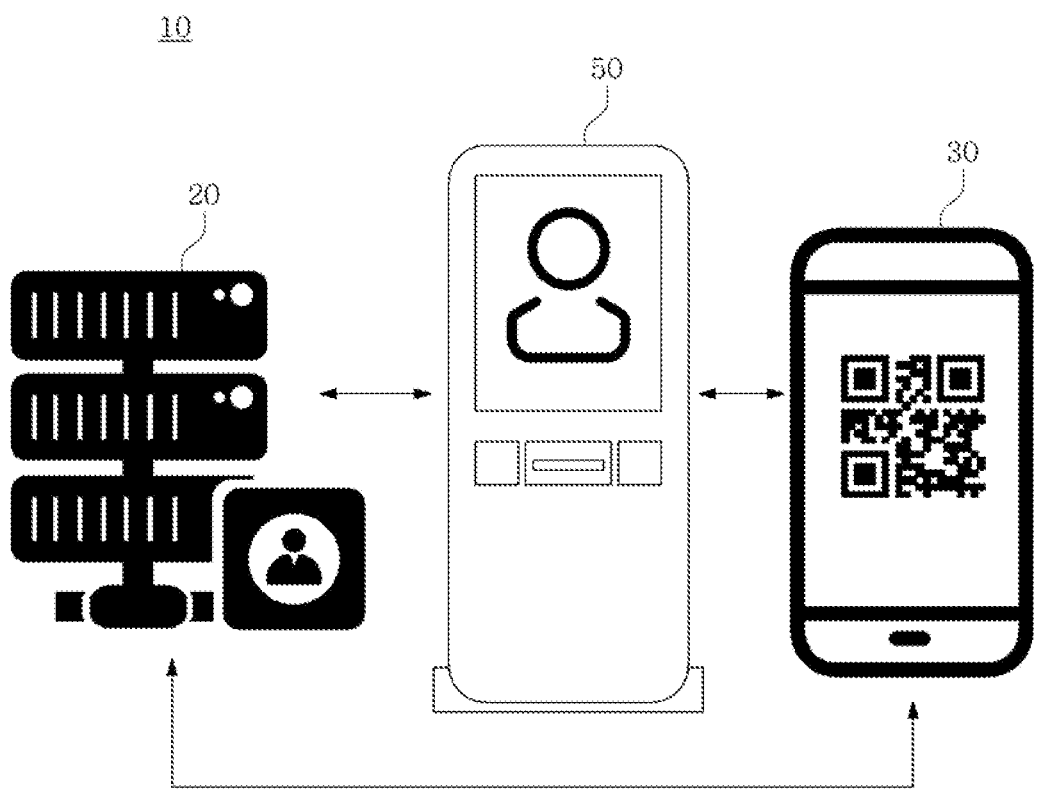

【FIG. 3】
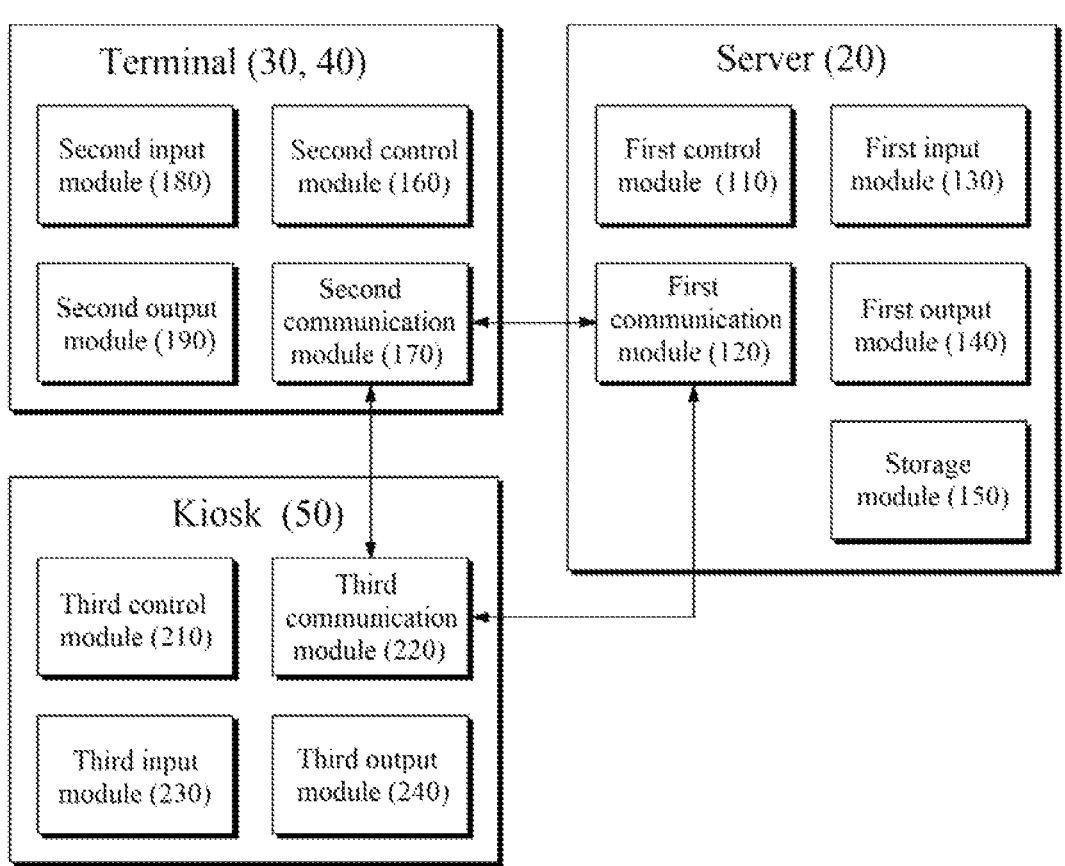

【FIG. 4】
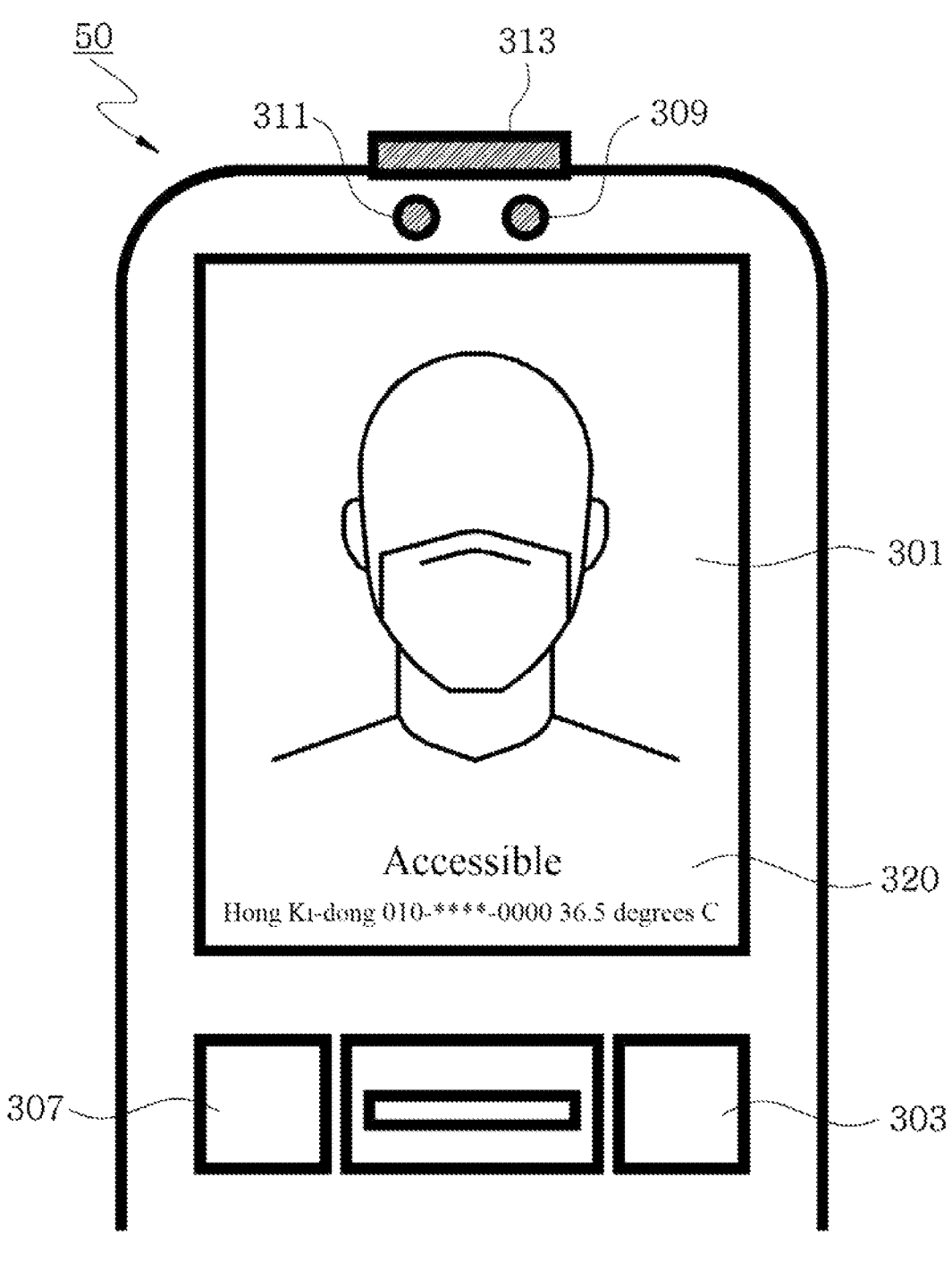

【FIG. 5】
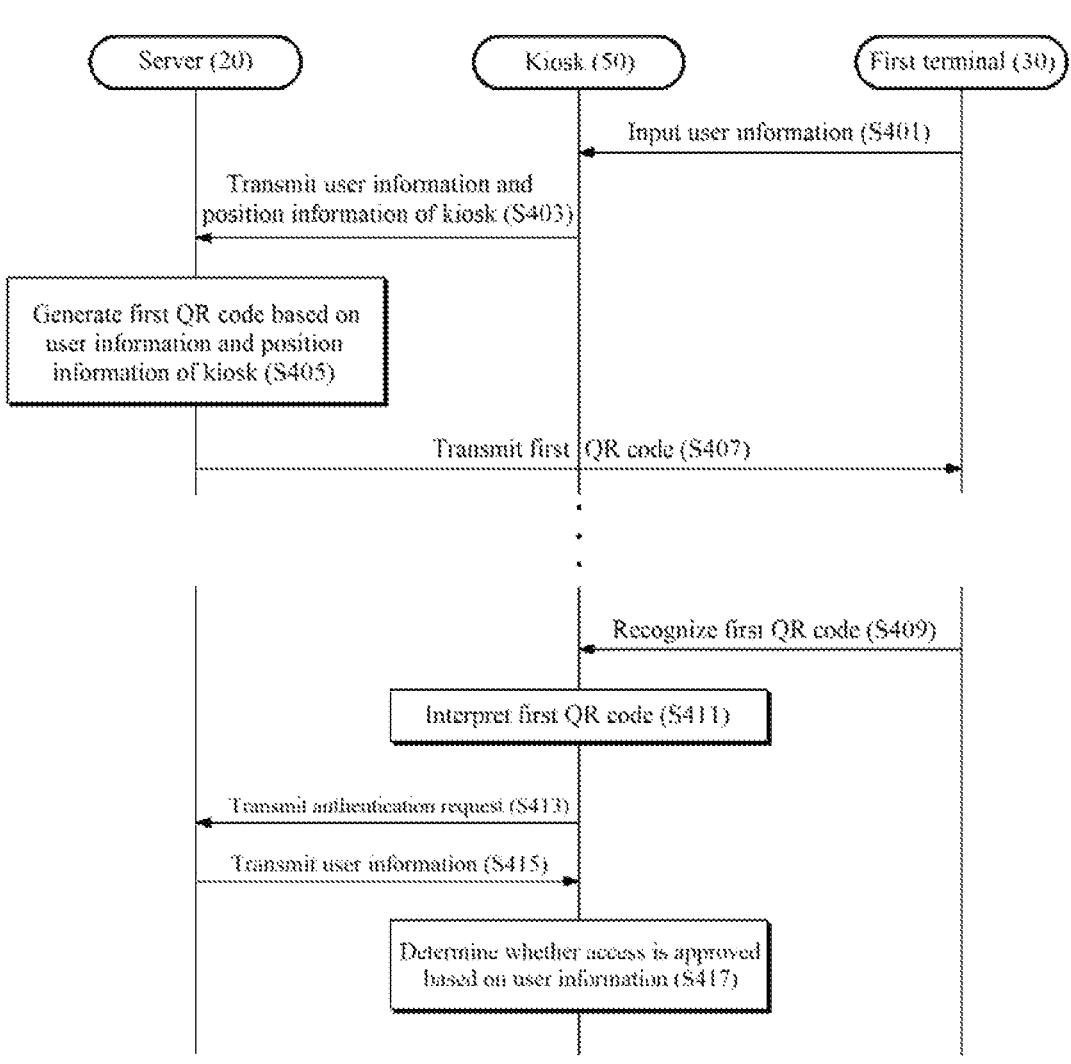

【FIG. 6】
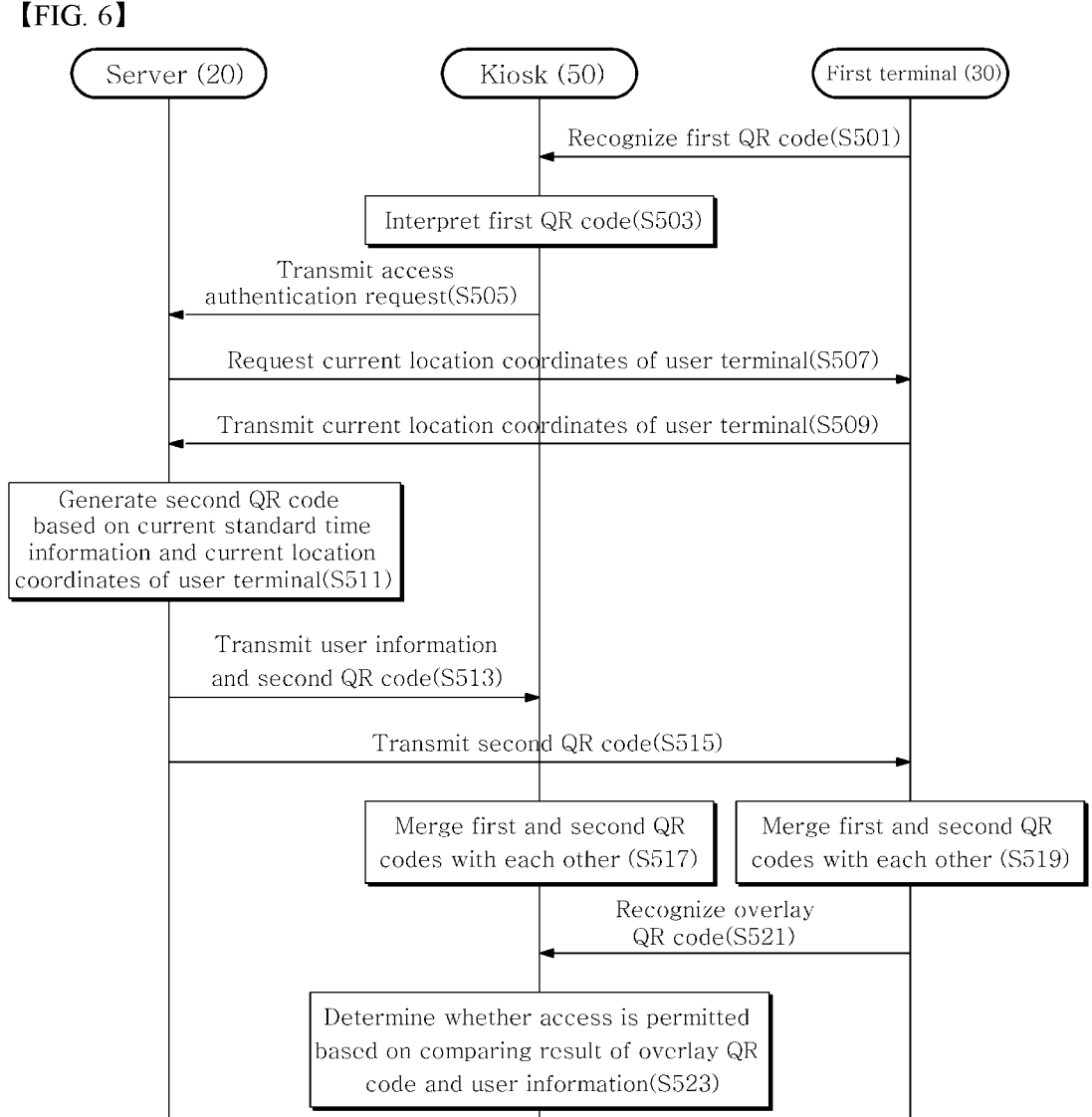

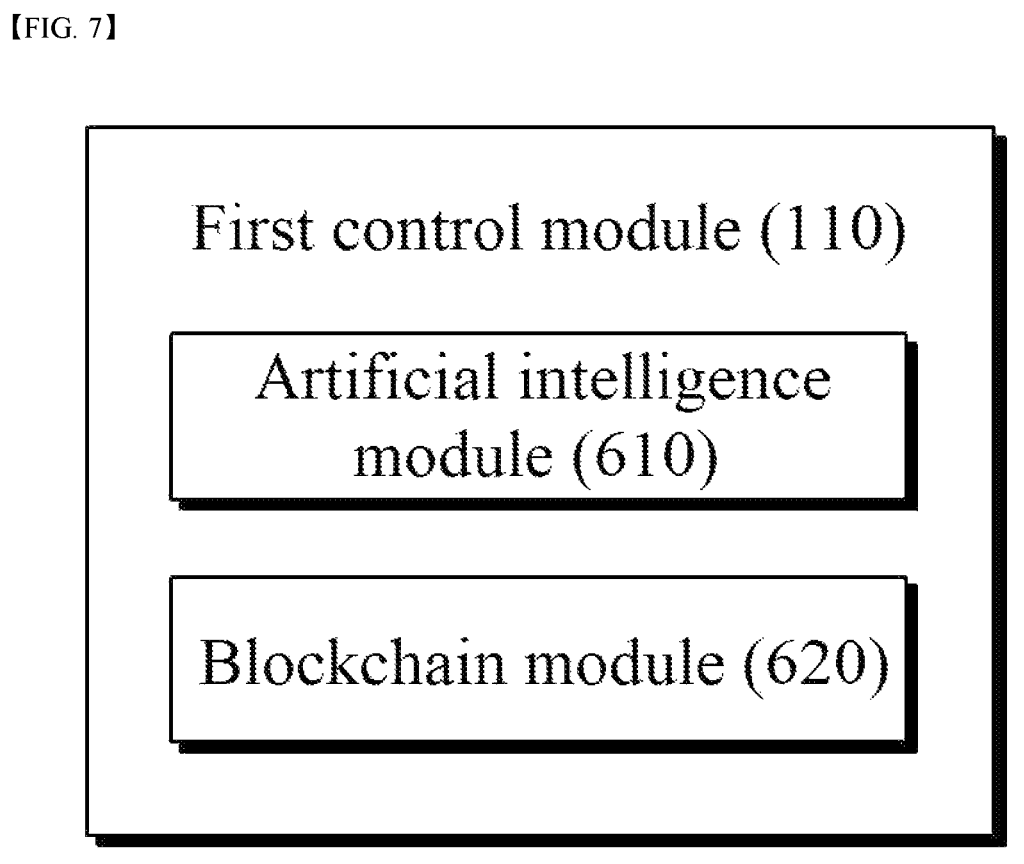

【FIG. 7】

First control module (110)

Artificial intelligence module (610)

Blockchain module (620)

【FIG. 8】
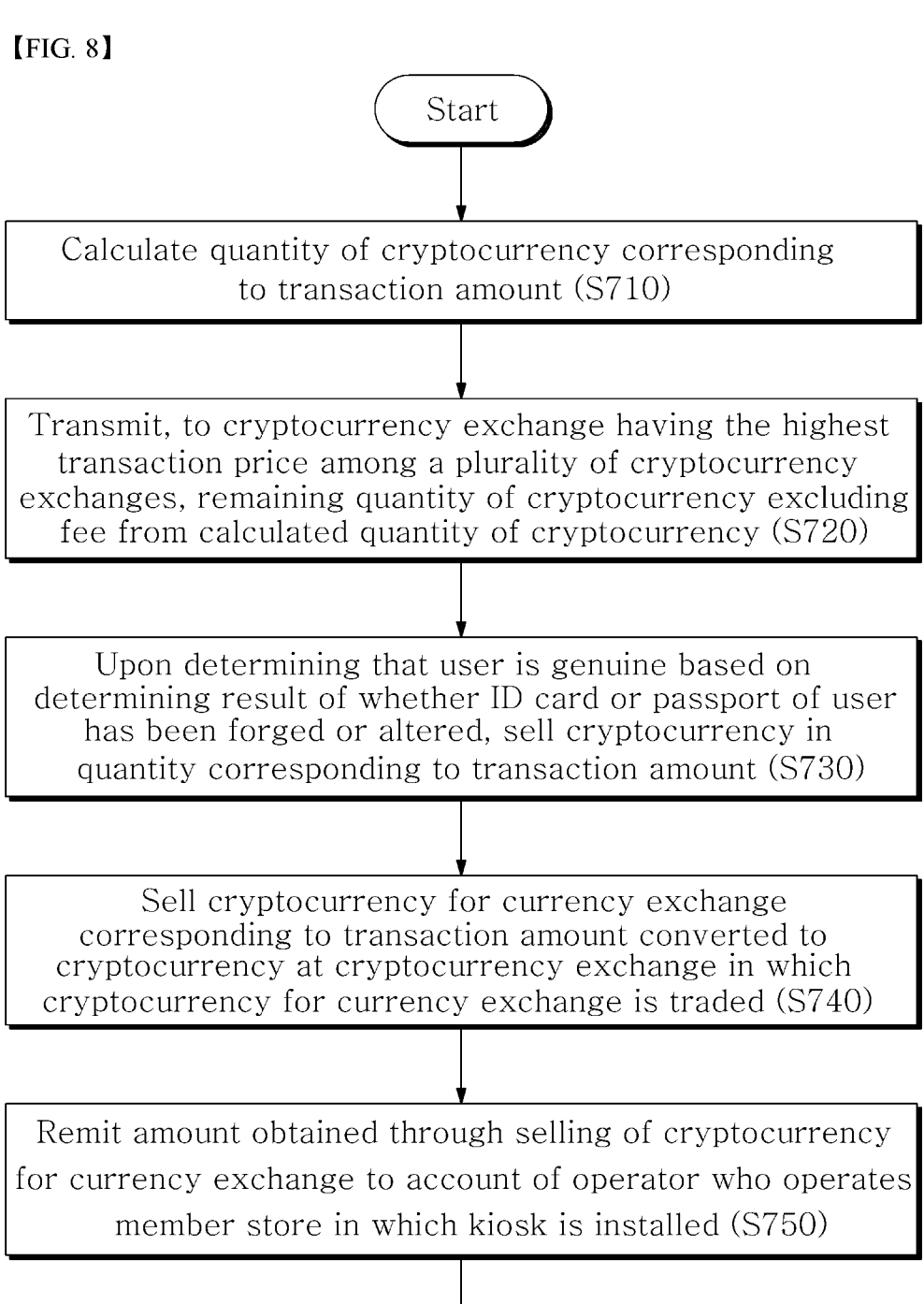

DEVICE SUPPORTING FINANCIAL SERVICES, AND INTEGRATED SYSTEM THEREFOR

CROSS-REFERENCE TO RELATED APPLICATIONS

This is a National Stage of International Application No. PCT/KR2021/014260 filed Oct. 14, 2021, claiming priority based on Korean Patent Application No. 10-2021-0136078 filed Oct. 13, 2021, the entire disclosures of which are incorporated by reference herein.

TECHNICAL FIELD

The present disclosure relates to a device for supporting a financial service. Further, the present disclosure proposes an integrated system in which a technology such as a QR code, a blockchain, a DeFi (a distributed financial), an NFT (non-fungible token), and a metaverse is combined with a financial service.

Further, the present disclosure relates to a method and a device for providing a blockchain-based financial service and, more specifically, to a method and a device for providing a service for performing a payment or a currency exchange through a blockchain-based cryptocurrency as performed in real time without delay of a processing time.

Further, the present disclosure relates to an ATM security device and an operation method thereof, in which in an account opening process, forgery/alteration of an identification card is determined, and an identity of an identification card holder is permitted based on a comparing result of a face of the identification card holder with a face of an identification card photograph.

The present disclosure also relates to an electronic access management system using a QR code.

BACKGROUND ART

Recently, as the number of types of products related to a financial service such as various insurance services or bank services increases, many people find and subscribe to the products required therefor through comparison or analysis of the products. In this process, in order to directly check the contents of each product and calculate costs and the like, people inquire each product using information related to a situation thereof while they do not subscribe to the product.

In particular, in the process of inquiring the product of the financial service, personal information, which is sensitive information of an individual may be used by the service provider. To this end, each time the individual checks each product, she/he checks the same guide phrase, terms and conditions, and the like, and provides the agreement therewith by marking an arrangement mark thereon.

In this process, each time a financial service or a provider providing the financial service (for example, a financial service providing company such as a service providing company such as an insurance company) is changed, she/he should check almost the same guide phrase and terms and conditions, and the like, and provide the agreement therewith by marking an arrangement mark thereon. When the same financial service provider provides different financial services such as insurance services, she/he should repeat the same process on each of the different financial services.

However, as the number of the types of the financial products such as the insurance services increases, people should perform a hassle and repetitive process to inquire the product. Thus, the inconvenience or the number of steps taken up to the subscription thereto may be greatly increased. In this regard, although a large number of schemes for recommending a financial service in consideration of a situation of the individual has been proposed, there is a problem in that the scheme related to integration of a form used for the financial service is absent.

Also, under the evolution of the IT technology and the business model, and the spread of the trend of the smart payment, the non-official cryptocurrency is emerging. The representative cryptocurrency Bitcoin has recently been an issue for several years. This may be because the Bitcoin has the purpose of replacement of a legal tender issued by a central bank unlike existing digital money. Further, this may be because the cryptocurrency may be utilized for an illegal activity such as tax evasion, money laundering, illegal drug dealing, and the cryptocurrency exchange goes bankrupt.

Specifically, the Bitcoin is based on a network over which the computers of the worldwide users are individually connected to each other. There is no issuing institution of Bitcoin, and anonymity is guaranteed in Bitcoin transactions. Since the Bitcoin is used as a payment means in the online and offline space, the Bitcoin is used as a payment means in the online and offline space. Bitcoin is issued and distributed beyond nationality. Bitcoin transactions are possible anywhere where the Internet is active, without currency exchange or credit cards. This leads to convenience and cost-saving.

Further, the Bitcoin has developed up to a technology in which an amount remaining after exchange is converted into a Bitcoin on the basis of allowing a transaction for exchanging a legal tender with cryptocurrency using a dedicated ATM within 2014 in Japan. Further, it is expected that utility of the cryptocurrency increases and the number of users thereof increases through convergence of absorbing advantages of different types such as improvement in exchange with the legal tender, enlargement of on/offline use, and the like.

However, in view of a situation in which Bitcoin is held as an asset rather than actually having an exchange value that may be received by the general public and being used as a general currency or means of payment with the function of measuring a value and guaranteeing a value, there is insufficient research and research to support the role of the cryptocurrency as currency or funds or means of payment equivalent thereto.

In particular, when a payment is performed through cryptocurrency or a currency exchange is performed using cryptocurrency, a dedicated ATM for cryptocurrency may be used. In this case, a confirm procedure should be performed in a process of using the cryptocurrency for the payment or the exchange. The payment or exchange through cryptocurrency may be finally completed when the confirmation procedure is completed. However, it may take a time to process the confirmation procedure performed in the process of using the cryptocurrency for the payment or the exchange. Thus, it is difficult for the user to use the cryptocurrency in real time.

DISCLOSURE

Technical Purpose

An object of the present disclosure is to applying a technology, such as a QR code, a blockchain, a DeFi, a metaverse, and an NFT (non-fungible token), to a financial service.

Further, an object of the present disclosure is to propose an electronic access management system capable of generating and managing a QR code corresponding to a user terminal at each kiosk installed at a specific location.

Further, an object of the present disclosure is to provide an electronic access management system capable of preventing spoofing behavior of a QR code corresponding to a user terminal.

Further, an object of the present disclosure is to provide an electronic access management system capable of preventing forgery and ensuring integrity of an original QR code.

Further, an object of the present disclosure is to provide an ATM machine capable of determining forgery/falsification of an identification card, and recognizing a face of a user from a photographed image, and calculating a matching percentage between the recognized user face and a user picture in the identification card, and an operating method thereof.

Further, an object of the present disclosure is to provide a method and a device for providing a service for performing a payment or a currency exchange through a blockchain-based cryptocurrency performed in real time without delay of a processing time.

Technical Solution

An embodiment of the present disclosure proposes an integrated system supporting a financial service including a first terminal in which an online platform supporting the financial service is executed; and a server for operating the online platform, wherein the server is configured to: receive first user information from the first terminal; perform an authentication procedure on the first user of the first terminal based on the first user information; determine whether to provide the financial service to the first user based on a result of the authentication procedure; and transmit information for providing the financial service to the first terminal, based on the determination result.

The integrated system further comprises a second terminal in which the online platform is executed, wherein the financial service includes a DeFi (Decentralized Finance) service, wherein the first terminal is configured to: transmit the first user information to the second terminal; receive blockchain-based encrypted information corresponding to the first user information from the second terminal; and decrypt the blockchain-based encrypted information.

The integrated system further comprises a kiosk including an input module and an output module.

The financial service further includes a currency exchange service, wherein the kiosk is configured to: collect an identification (ID) card of the first user captured through the input module; and analyze the identification card and determine whether to provide the currency exchange service, based on the analyzing result.

The kiosk is configured to: apply an object extraction algorithm to the ID card to obtain object information; and determine whether to provide the currency exchange service, based on the object information.

The server is configured to: generate a first QR code based on information about the kiosk and the first user information; and transmit the first QR code to the first terminal; wherein the first terminal is configured to display the first QR code received from the server thereon, wherein the kiosk is configured to determine whether access of the first user to a place in which the kiosk is installed is permitted, based on the first QR code displayed on the first terminal.

The kiosk further includes a scanner for collecting the identification card, wherein the first user information includes a mobile phone number of the first user and personal information of the first user.

The server is configured to: when an access authentication request signal is received from the kiosk, request current location coordinates of the first user terminal to the first terminal; generate a second QR code based on the current location coordinates of the first terminal and current standard time information; transmit the second QR code to the kiosk and the first terminal, wherein the first terminal is configured to: generate a first overlay QR code based on the first QR code and the second QR code; and transmit the first overlay QR code to the kiosk, wherein the kiosk is configured to: generate a second overlay QR code based on the first QR code and the second QR code; and compare the first overlay QR code and the second overlay QR code with each other and determine whether access of the first user is permitted, based on the comparing result.

Each of the first overlay QR code and the second overlay QR code is generated by positioning a position detection pattern of the first QR code and a position detection pattern of the second QR code on the same axis, and comparing each cell of the first QR code and each cell of the second QR code with each other, and setting an identical cell thereof as a black cell and an non-identical cell thereof as a white cell.

The integrated system includes a plurality of kiosks respectively installed in a plurality of preset specific locations, wherein the first terminal stores therein a plurality of first QR codes corresponding to the plurality of kiosks in a separate manner.

A system according to an embodiment of the present disclosure comprises: a kiosk which is installed at a predetermined specific location, receives user information, and determines whether to permit access based on a first QR code output onto a user terminal; the user terminal which outputs the first QR code received from a manager server; and the manager server which receives user information from the kiosk, generates the first QR code based on the kiosk information and the user information, and transmits the first QR code to the user terminal.

In this case, the kiosk may further include an identification card scanner for extracting personal information of a user from an identification card, and the user information may be a mobile phone number of the user and identification information of the user.

In this case, upon receiving an access authentication request signal from the kiosk, the manager server requests the current location coordinate of the user terminal, generates a second QR code on the basis of the current location coordinate of the user terminal and current standard time information, and transmits the second QR code to the kiosk and the user terminal, and the user terminal generates a first overlay QR code on the basis of the first QR code and the second QR code, and transmits the first overlay QR code to the kiosk, and the kiosk may generate a second overlay QR code based on the first QR code and the second QR code, and may compare the first overlay QR code with the second overlay QR code and may determine whether to permit access based on the comparing result.

In this case, each of the first overlay QR code and the second overlay QR code is generated by positioning a position detection pattern of the first QR code and a position detection pattern of the second QR code on the same axis, and comparing each cell of the first QR code and each cell of the second QR code with each other, and setting an identical cell thereof as a black cell and an non-identical cell thereof as a white cell.

In this case, at least one kiosk may be installed at one or more preset specific locations, and the user terminal may store one or more first QR codes corresponding to each kiosk in a separate manner.

The kiosk according to one embodiment of the present disclosure comprises: an input/output unit for calculating the quantity of cryptocurrency corresponding to a transaction amount inputted from a user who uses the service, and transmitting, to a cryptocurrency exchange having the highest transaction price among a plurality of cryptocurrency exchanges, a remaining quantity of cryptocurrency excluding a fee from the calculated quantity of cryptocurrency; an operating unit for operating a cryptocurrency for currency exchange, wherein upon determining that the user is genuine based on a determining result of whether the scanned ID card or passport of the user has been forged or altered, the operating unit may sell the cryptocurrency in a quantity corresponding to the transaction amount, and may sell the cryptocurrency for currency exchange corresponding to the transaction amount converted to the cryptocurrency at a cryptocurrency exchange in which the cryptocurrency for currency exchange is traded; and a remittance unit for remitting the amount obtained through the selling of the cryptocurrency for currency exchange to an account of an operator who operates the member store in which the service providing device is installed.

In this regard, the input/output unit may receive the type of language and the type of the currency from the user, and may provide the financial service based on the selected type of language and the selected type of the currency.

In this regard, the input/output unit may output a wallet address to which the calculated amount of cryptocurrency is deposited as an identification code, check whether the output quantity of cryptocurrency was deposited to the wallet address through the user terminal of the user reading or scanning the identification code, and generate and output a deposit event when the cryptocurrency has been deposited.

In this regard, the service providing device may scan the identification card or the passport through a scanner pre-linked thereto, determine whether the scanned identification card or passport is forged or falsified to check whether the user is genuine, and may delete information about the identification card or the passport when the confirmation process of the financial service has been normally completed.

In this regard, when the fall amount of the market price of the cryptocurrency for currency exchange is greater than a preset reference, the service providing device may perform a circuit brake.

A method for operating a system according to an embodiment of the present disclosure comprises calculating the quantity of cryptocurrency corresponding to a transaction amount inputted from a user using the service through an input/output unit of the service providing device, and transmitting, to a cryptocurrency exchange having the highest transaction price among a plurality of cryptocurrency exchanges, a remaining quantity of cryptocurrency excluding a fee from the calculated quantity of cryptocurrency; upon determining that the user is genuine based on a determining result of whether the scanned ID card or passport of the user has been forged or altered, selling, by an operating unit for operating a cryptocurrency for currency exchange, the cryptocurrency in a quantity corresponding to the transaction amount, and selling, by the operating unit, the cryptocurrency for currency exchange corresponding to the transaction amount converted to the cryptocurrency at a cryptocurrency exchange in which the cryptocurrency for currency exchange is traded; and remitting, by the a remittance unit of the service provision device, the amount obtained through the selling of the cryptocurrency for currency exchange to an account of an operator who operates the member store in which the service providing device is installed.

In this regard, the operating method may include receiving a type of language and a type of currency selected from the user through the input/output unit, and providing the financial service based on the selected type of language and the selected type of the currency.

In this regard, the operating method may include outputting, as an identification code, a wallet address to which the calculated amount of cryptocurrency is to be deposited through the input/output unit, checking whether the output quantity of cryptocurrency has been deposited to the wallet address through the user terminal of the user reading or scanning the identification code, and generating and outputting a deposit event when the cryptocurrency has been deposited.

In this regard, the operating method may include scanning the identification card or the passport through a scanner pre-linked to the service providing device, determining whether the user is genuine based on the determination result about whether the scanned identification card or passport is forged or falsified, and deleting information about the identification card or passport when the confirmation process of the financial service has been normally completed.

In this regard, the operating method may include performing a circuit brake through the service providing device when the fall amount of the market price of the cryptocurrency for currency exchange is greater than a preset reference.

According to various embodiments, an automated teller machine (ATM) machine that supports payment, deposit/withdrawal, currency exchange, charging, and overseas remittance functions comprises a display, a communication interface, a camera module, an identification card scanner, and a processor, wherein the processor is configured to, in response to receiving an account opening request from a user, scan an identification card of the user by using the identification card scanner and determine whether the identification card is not forged/falsified; when it is determined that the identification card is not forged/falsified, transmit the identification information and the user picture extracted from the identification card to an external server using the communication interface to inquire whether the identification card is valid; when a response indicating that the identification card is valid is received from the external server, display a preview image captured using the camera module on the display, recognize a face of a user in the preview image by using an artificial intelligence model for face recognition, perform liveness detection to determine whether the face of the user is a fake image, and when it is determined that the face of the user is not a fake image as a result of performing the liveness detection, capture a specific image from the preview image, calculate a matching percentage between the user face in the captured specific image and a reference face in the user picture by using an artificial intelligence model for calculating a matching percentage between the faces; and when the matching percentage is greater than or equal to a predetermined first threshold, generate a QR code related to the account opening for the user, and transmit the QR code to the user device of the user through the communication interface.

The processor may be configured to determine a type of the identification card, and transmit the identification card identification information and the user picture to the external server corresponding to the type of the identification card among a plurality of pre-registered external servers.

Upon receiving a response indicating that the identification card is valid from the external server, the processor may deactivate the remaining area in the display other than the predetermined guide area while displaying the partial image of the preview image through the predetermined guide area, and when the user face is not recognized from the partial image displayed in the predetermined guide area for a predetermined time duration from the time when the remaining area is deactivated, switch a state of the remaining area from an inactive state to an activated state, and allow the user face to be recognized from the preview image displayed on the entire area of the display.

The processor may be configured to stop displaying the preview image and display the captured specific image on the display while calculating the matching percentage between the user face and the reference face.

The processor may be configured to stop displaying the captured specific image when the matching percentage is smaller than the predetermined first threshold and equal to or greater than a predetermined second threshold, display a preview image newly captured using the camera module on the display, and newly calculate a matching percentage with the reference face using the newly captured preview image.

The processor may be configured to register a request for allowing a call center in association with the ATM device to authenticate identity information of the user when the matching percentage is smaller than the predetermined second threshold, check whether the user is included in a dangerous person list registered in a specific server when the identity authentication success response of the user is received from the call center, and when the user is not included in the dangerous person list, generate the QR code, and transmit the QR code to the user device of the user.

Advantageous Effects

According to the present disclosure, the local products may be purchased on the basis of a real-time market price of and a currency exchange rate between the legal currency and the cryptocurrency selected by the user so that the cryptocurrency may function as various types of financial products and currencies, wherein the authenticity of the identification card and adult authentication are performed, and then, access to the affiliated store or the vending machine is allowed based on the result of the authenticity of the identification card and adult authentication, and mileage or purchasable products of the member are managed based on each member and age, and a private blockchain using each member store as a node may be generated, such that a distributed ledger including inventory management and member management may be shared. Thus, a foundation that may evolve into a new business model such as an electronic wallet, another type of cryptocurrency integration and exchange service, an online cryptocurrency exchange, a cryptocurrency ATM, and the like may be established. This may contribute to the enlargement and development of cryptocurrency-related business.

In particular, a time required for a processing time in a process in which the user uses a payment service or a currency exchange service that may be provided based on cryptocurrency may be reduced, thereby providing a cryptocurrency-based payment service and a currency exchange service in real time.

Further, according to the present disclosure, the system may first self-verify whether the identification card submitted during the account opening process is forged/falsified, transmit the identification information and the user picture extracted from the identification card to the external server to second verify whether the identification card is forged/falsified. Whether the user face recognized from the photographed image is a fake image is determined. Then, a matching percentage between the recognized user face and the user face of the user picture is calculated, thereby providing a reliable identification check result.

Further, according to the present disclosure, the QR code corresponding to the user terminal may be generated and stored in each kiosk installed at a specific location.

Further, according to the present disclosure, there may be provided an electronic access management system capable of preventing spoofing behavior of the QR code corresponding to a user terminal.

Further, according to the present disclosure, there may be provided an electronic access management system capable of preventing forgery/falsification of an original QR code and ensuring integrity of the original QR code.

DESCRIPTION OF DRAWINGS

FIGS. 1 and 2 are diagrams illustrating an integrated system according to an embodiment of the present disclosure.

FIG. 3 is a block diagram illustrating an integrated system according to an embodiment of the present disclosure.

FIG. 4 is a diagram for illustrating an operation of a kiosk according to an embodiment of the present disclosure.

FIGS. 5 and 6 are flowcharts illustrating an operation of an integrated system according to an embodiment of the present disclosure.

FIG. 7 is a block diagram illustrating a control module according to an embodiment.

FIG. 8 is a flowchart illustrating an operation of an integrated system according to an embodiment of the present disclosure.

BEST MODE

FIG. 1 is a diagram illustrating an integrated system according to an embodiment of the present disclosure.

Referring to FIG. 1, an integrated system 10 according to an embodiment of the present disclosure may include a server 20, a first terminal 30, and/or a second terminal 40.

The server 20 is a device for operating a financial service platform of the present disclosure, and the financial service platform may be an online service provided through a website and/or a mobile application or a platform for a service provided through a kiosk 50.

For example, each of the first terminal 30 and/or the second terminal 40 may be a wireless communication device that ensure portability and mobility, and may include all types of handheld wireless communication devices, such as a navigation, PCS(Personal Communication System), GSM (Global System for Mobile communications), PDC(Personal Digital Cellular), PHS(Personal Handyphone System), PDA (Personal Digital Assistant), IMT(International Mobile Telecommunication)-2000, CDMA(Code Division Multiple Access)-2000, W-CDMA(WCode Division Multiple Access), Wibro(Wireless Broadband Internet) terminals, a smartphone, a smart pad, a tablet PC, etc.

Further, the first terminal 30 and/or the second terminal 40 may be embodied as a computer capable of connecting to a remote server or terminal through a network. For example, the computer may include a navigation, a notebook computer equipped with a web browser, a desktop computer, a laptop computer, and the like. In this case, the first terminal 30 and/or the second terminal 40 may be embodied as a terminal capable of connecting to a remote server or terminal through a network.

Further, a purpose of the present disclosure is to provide a financial service to a user who is a customer of a financial service using technologies such as Quick Response (QR) code, Blockchain, Decentralized Finance (DeFi), Non-Fungible Token (NFT), and Metaverse, etc.

The DeFi (de-centralized financial or distributed economy) is not dependent on a central financial intermediary, such as an intermediary, exchange, or bank, but instead is a blockchain-based financial form that utilizes a smart contract in a blockchain. Through the DeFi network, people may borrow funds to other people and predict the price fluctuations of the assets using the derivative products. Further, people may transact cryptocurrency, prepare for risk, and obtain the interest in an account such as a saving account.

The DeFi is deployed based on an application known as a Decentralized Application (DApp) performing a financial function in a blockchain. A transaction with a central broker is not made, and a direct transaction is made between participants based on the smart contract program. Based on such a system, a complex financial service may be made by connecting and operating multiple participants in the DApp. For example, a stable coin holder may deposit assets in a liquidity pool, such as an Aave. This may have an advantage over a conventional case in which people may borrow the fund from the pool only when they should provide more additional collateral than the loan amount. The protocol automatically adjusts the interest rate according to the instantaneous demand for assets. The Aave also provides a "Flash Loan" in the market. "Flash loan" is an unsecured loan of any amount and is collected and repaid within minutes. Although there may be legitimate uses for loans such as arbitrage, collateral swaps and self-liquidation, the DeFi platform have also been abused, including using the flash loan for short-term manipulation of cryptocurrency spot prices. "Decentralized" means there is no central exchange. The DeFi program is executed using open source software in the developer and customer community.

In one example, the DeFi protocol is executed in an Ethereum block chain. More specifically, the DeFi protocol is the distributed exchange in which transactions of hundreds of digital tokens issued in an Ethereum block chain are permitted. The algorithm of the Uniswap is encouraged to form a liquidity pool for the token by causing the user to pay a transaction fee for people providing the liquidity. The development team creates software to be distributed to the Uniswap. However, the platform is ultimately managed by the user. Further, it is not clear that the location regulatory authority takes the legitimacy of the platform such as Uniswap.

The NFT (non-fungible token) refers to a data unit stored in a blockchain and means a token which cannot be copied, substituted, or subdivided. NFT may also be used to represent photos, video, audio, and other types of digital files.

The metaverse or an extended virtual world is a new word obtained by combining 'meta', which means virtual and transcendent, and 'universe', which means world and universe with each other. The metaverse has also been translated to a 'virtual space'. This means a virtual world in which job, financial, learning, and the like, as activities legally recognized are connected to the real life in a three dimension. Specifically, the metaverse is widely used to mean a living, game-type virtual world where reality and unreality coexist in overall aspects of politics, economy, society, and culture.

FIG. 2 is a diagram illustrating an integrated system according to an embodiment of the present disclosure.

Referring to FIG. 2, the integrated system 10 according to an embodiment of the present disclosure may include a server 20, a first terminal 30, and/or a kiosk 50, and may further include other terminals, such as a second terminal 40, although not illustrated in FIG. 2.

The kiosk 50 may be installed in a location or a device (e.g. internal to an ATM device) that needs to check identification (or identification or identity verification) of a user of the first terminal 30 and/or the second terminal 40, or an entrance of a place to manage access thereto, and the like. Furthermore, in one embodiment of the present disclosure, the kiosk 50 may control the locking device at the entrance based on a determining result about whether access is permitted based on the identity information of the visitor, or create an access register that records the identity information of the visitor.

In this regard, one or more kiosks 50 may be installed at a preset specific location, may receive user information from a person trying to enter, and may determine whether access is authorized based on a first QR code displayed on the first terminal 30.

In this regard, the kiosk 50 is not limited to kiosk in the dictionary meaning, and may include any device capable of communicating with computers, smartphones, cell phones, smart TVs, set-top boxes, tablet PCs, etc. and may recognize the QR code displayed on the first terminal 30 and/or the second terminal 40. In this regard, the computers may include laptop computers, desktops, etc.

FIG. 3 is a block diagram showing an integrated system according to one embodiment of the present disclosure.

Referring to FIG. 3, the server 20 may include a first control module 110, a first communication module 120, a first input module 130, a first output module 140, and/or a storage module 150. The server 20 may be a server that operates a financial service platform according to one embodiment of the present disclosure.

Each of the first terminal 30 and/or the second terminal 40 may include a second control module 160, a second communication module 170, a second input module 180, a second output module 190, and/or, an internal battery (not shown).

The kiosk 50 may include a second control module 210, a second communication module 220, a second input module 230, a second output module 240, and/or an internal battery (not shown).

The control modules 110, 160, and 210 may directly or indirectly control the server 20, the first terminal 30, the second terminal 40, and/or the kiosk 50 to implement an operation/operation/process according to an embodiment of the present disclosure. Further, each of the control modules 110, 160, and 210 may include at least one processor. The processor may include at least one central processing unit (CPU) and/or at least one graphics processing device (GPU).

In addition, each of the control modules 110, 160, and 210 may generate and/or manage control information (e.g. instructions) or the like based on API (Application Programming Interface), IoT (Internet of Things), IIoT (Industrial Internet of Things), and ICT (Information & Communication Technology) technologies, etc.

The communication modules 120, 170, and 220 may transmit and receive various data, signals, and information to and from the server 20, the first terminal 30, the second terminal 40, and/or the kiosk 50. Furthermore, each of the communication modules 120, 170, and 220 may include wireless communication modules (e.g., cellular communication modules, short-range wireless communication modules, or global navigation satellite system (GNSS) communication modules) or wired communication modules (e.g., local area network (LAN) communication module, or power line communication module). Furthermore, the communication modules 120, 170, and 220 may communicate with external electronic devices through a first network (e.g., a short-range communication network such as Bluetooth, WiFi direct, or Infrared Data Association (IrDA)) or a second network (e.g., a cellular network, the Internet, or a computer network (e.g., a long-range communication network (e.g. LAN or WAN)). These various types of communication modules may be integrated into one component (e.g., a single chip) or may be embodied as a plurality of separate components (e.g., multiple chips), respectively.

Additionally, the communication modules 120, 170, and 220 of the present disclosure may operate based on communication standard technology.

The input modules 130 and 180 may receive commands or data to be used for components (e.g. the control module 110, etc.) of the server 20, the first terminal 30, the second terminal 40, and/or the kiosk 50 from a source (e.g. a user (e.g. a first user, a second user, etc.), a manager of the server 20, etc.) external to the server 20 and/or the first terminal 30. Further, the input modules 130 and 180 may include a touch-recognizable display, a touchpad, a button-type recognition module, a voice recognition sensor, a microphone, a mouse, or a keyboard installed in the server 20, the first terminal 30, the second terminal 40, and/or the kiosk 50. In this regard, the touch-recognizable display, the touch pad, and the button-type recognition module may recognize a touch through a user's body (e.g. a finger) through a resistive and/or capacitive scheme.

The output modules 140, 190, and 240 are modules that display signals (e.g. voice signals), information, data, images, and/or various objects generated by the server 20, the first terminal 30, the second terminal 40, and/or the control modules 110, 160, and 210 of the kiosk 50, or acquired through the communication modules 120, 170, and 220. For example, the output modules 140, 190, and 240 may include a screen, a displaying unit, a speaker, and/or a light emitting device (e.g. an LED lamp).

The storage module 150 stores therein data such as a basic program, an application program, and configuration information about operations of the server 20, the first terminal 30, the second terminal 40, and/or the kiosk 50. Further, the storage module may include at least one storage medium from among a flash memory type, a hard disk type, a multimedia card micro-type, a card-type memory (for example, an SD or XD memory, etc.), a magnetic memory, a magnetic disk, an optical disk, a random access memory (RAM), a Static Random Access Memory (SRAM), a Read Only Memory (ROM), a Programmable Read Only Memory (PROM), and an Electrically Erasable Programmable Read Only Memory (EEPROM).

Furthermore, the storage module 150 may store therein personal information of a customer (a first user) using the server 20, the first terminal 30, the second terminal 40, and/or the kiosk 50, personal information of the manager (second user) thereof, and the like. In this regard, the personal information may include a name, an ID (identifier), a password, a road name address, a phone number, a mobile phone number, an email address, and/or information indicating a reward (e.g. a point, etc.) generated by the server 20. Further, the control modules 110, 160, and 210 may perform various operations using various images, programs, contents, and data stored in the storage module 150.

FIG. 4 is a diagram for illustrating an operation of the kiosk according to one embodiment of the present disclosure.

FIG. 5 is a flowchart showing the operation of the integrated system according to one embodiment of the present disclosure.

Referring to FIG. 4 and FIG. 5, in order to achieve the purpose of the present disclosure, the kiosk 50 according to one embodiment of the present disclosure may include a touchable display 301 that may receive information from the user and output the information, a QR code reader 303 capable of recognizing the QR code displayed on the first terminal 30, a scanner 305 that may extract user information by scanning the user's ID card, a result output unit 307 that may output a paper with the access authentication result printed thereon, a camera 309 that may photograph the user's face, etc., an infrared heat detection camera 311 that may measure the user's body temperature, and a lighting device 313 for photography.

In this regard, when the user creates a new QR code, the kiosk 50 according to one embodiment of the present disclosure captures the user's face through the camera 309, compares the captured image with the photo extracted through the scanner 305 through an artificial intelligence-based facial recognition module, and includes the comparing result in the user information. Thus, when using the QR code, the kiosk 50 may determine whether the user is a genuine user. Furthermore, in this regard, the artificial intelligence-based facial recognition module may be configured to check whether or not a mask is worn for more stringent access authentication.

Furthermore, when the user seeking entry is at risk of an infectious disease, that is, when his/her body temperature exceeds the preset critical temperature (ex. 37.5 degrees C.), there is a high possibility that he/she has been exposed to an infectious disease. Thus, the kiosk 50 uses an infrared heat detection camera 311 to measure the body temperature of the user seeking the entry, and may determine whether or not access is permitted based on the user's body temperature.

Furthermore, when the user allows the QR code reader 303 to recognize the QR code displayed on the first terminal 30, the kiosk 50 according to one embodiment of the present disclosure displays may output user information and access authentication result 320 on the display 301.

In this regard, the first QR code may be generated by the server 20 based on the user information and may be transmitted from the server 20 to the first terminal 30.

In this regard, the user information may include all information that may identify the visitor, for example, at least one of the visitor's mobile phone number, name, date of birth, address, etc. The user may input the user information using the input module of the kiosk 50.

However, when the user directly enters his/her personal information, this is not much different from writing it down by hand, and there is a risk of entering false personal information. Therefore, in order to accurately extract the user's personal information, the kiosk 50 may include a scanner 305 that may scan the ID card of the user.

In this regard, the scanner 305 may extract the user's identity information by scanning the ID card using which the kiosk may identify the user's identity, such as a resident registration card, driver's license, and passport. In this regard, the scanner 305 may include OCR (Optical Character Reader). Thus, the scanner 305 may extract at least one of a name, an address, a birth date, a gender, a country, and a passport number of the user as user information from the identification of the user.

Furthermore, the kiosk 50 may further include a QR code reader 303 capable of recognizing the QR code displayed on the first terminal 30. Therefore, the kiosk 50 may interpret the first QR code displayed on the first terminal 30, and may request user information corresponding to the first QR code to the server 20, and may determine whether to permit the access based on the user information received from the server 20.

In this regard, there may be people who want to enter the place where the kiosk is installed on a regular basis and people who want to enter the plate on a one-time basis. Thus, installing the application etc. on the first terminal 30 and storing the first QR code for both people who want to enter the place where the kiosk is installed on a regular basis and people who want to enter the place on a one-time basis may be inefficient. Therefore, a fixed QR code may be allocated to a person who intends to enter the place on a regular basis, while a one-time QR code may be allocated to a person who intends to enter the place on a one-time basis (such as a visitor from another region or a foreigner on tour).

For the above-described configuration, the kiosk 50 may provide a menu on which the user selects the fixed QR code and the one-time QR code on the display 301, and may selectively perform a following process depending on the selection from the user. In this regard, the process of receiving the user information and generating the QR code based on the user information is the same in both the selection of the fixed QR code and the selection of the one-time QR code, while schemes for providing the generated QR code in both the selection of the fixed QR code and the selection of the one-time QR code are different from each other.

First, when the fixed QR code is selected, the kiosk 50 may print and output the fixed QR code including a URL from which the first QR code may be downloaded on paper or displays the fixed QR code on the display 301 of the kiosk 50. Thus, the user may download the first QR code through the fixed QR code. Therefore, in this case, there is no need to transmit the first QR code directly from the server 20 to the first terminal 30.

Alternatively, when the one-time QR code is selected, the kiosk 50 may print and output the one-time QR code on the paper. In this regard, the one-time QR code may be identical with the first QR code. The user holding the paper with the one-time QR code printed thereon may allow the kiosk 50 installed at the place where the user want to enter to scan the paper and may be subjected to the access authentication process. Accordingly, a person who intends to enter the place one-time does not need to download the first QR code to the terminal thereof or install the application to store and manage multiple QR codes thereto.

The first terminal 30 may output the first QR code received from the server 20 through the second output module 190. Furthermore, the first terminal 30 may receive the first QR code from the server 20 through the communication module 170.

Furthermore, each of the first terminal 30 and/or second terminal 40 may include any device capable of communication, such as computers, smartphones, cell phones, tablet PCs, digital cameras, camcorders, e-book terminals, digital broadcasting terminals, PDAs (Personal Digital Assistants), PMPs (Portable Multimedia Player), navigations, MP3 players, wearable devices, audio players, and DVD players.

In order to record only the visitor list, only one QR code needs to be created and managed for each user. However, in order to determine whether access is permitted, it is advantageous in terms of security to generate a separate QR code per each access location. Accordingly, one or more kiosks 50 may be installed in a preset specific location, and the first terminal 30 may request the creation of one or more first QR codes corresponding to each of the kiosks 50 on a kiosk basis, and one or more first QR codes corresponding to each of the kiosks 50 may be stored and managed on a kiosk basis. Thus, the user may allow the first QR code corresponding to the kiosk 50 to be recognized by the kiosk 50 installed at the entrance of the place to which the user intends to enter. Thus, a list of visitors may be recorded, or the access authentication may be performed.

The server 20 according to one embodiment of the present disclosure may receive the user information from the kiosk 50, may generate the first QR code based on the kiosk information and the user information, and transmit the first QR code to the first terminal 30.

In this regard, the kiosk information may be a unique identifier of the kiosk 50, an identification value about the place where the kiosk 50 is located, or a current coordinate value of the kiosk 50. In this regard, the server 20 may generate the first QR code based on the identification value or the coordinate value and the user information, and transmit the first QR code to the first terminal 30. The first QR code and the user information may be stored in the storage module 150 of the server 20.

In this regard, the above user information may be encrypted and stored to prevent leakage thereof. Upon receiving an access authentication request corresponding to the first QR code from the kiosk 50, the server 20 may decrypt the encrypted user information corresponding to the first QR code and may transmit the decrypted user information to the kiosk 50.

The integrated system 10 according to one embodiment of the present disclosure may manage user access through the above-described configuration, and the operation flow of the system 10 will be described later.

FIG. 6 is a flowchart showing the operation of the integrated system according to one embodiment of the present disclosure.

Referring to FIG. 6, the first terminal 30 according to one embodiment of the present disclosure inputs user information into the kiosk 50 to generate the first QR code (S401).

In this regard, in the step S401, as described above, the user may input the user information directly, or the user information may be input by the suer inserting and/or placing an ID card using which the kiosk may authenticate the user into and/or on the scanner 305 of the kiosk 50. In this regard, the ID may include any ID based on which the kiosk may identify the user's identity, and may be, for example, a resident registration card, driver's license, and passport. When inserting and/or placing the identification card in and/or on the scanner 305, the kiosk 50 may extract or generate user information by scanning the identification card.

In this regard, the scanner 305 may include a forgery and falsification determination function to prevent unauthorized use (copying) of the identification cards such as resident registration cards, driver's licenses and passports. The reason why the QR code is generated based on the identification card according to an embodiment of the present disclosure is to intended to enable the QR code to be generated even when the first terminal 30 is not legally registered in a name of the user.

Conventionally, the telecommunication company's identity authentication has been mainly applied as a method to specify the user's identity, especially, for website membership registration, etc. For blockchain electronic identification (DID), the telecommunication company's identity authentication is being used only as means of verifying the identity.

In this regard, in order for a QR code issuing organization such as a Naver company to issue the QR code, the QR code issuing organization such as the Naver company first extracts first personal information input thereto at the time of membership registration at the QR code issuing organization, and extracts second personal information through identity authentication of the telecommunication company to which the first terminal 30 subscribes, and then issues the QR code based on a comparison result between the first personal information and the second personal information.

However, the conventional QR code issuance scheme had a problem in that it was difficult to issue a QR code using a terminal legally registered in the name of a family member or a terminal legally registered in the name of a company for business reasons. Furthermore, because the QR code issuing organizations issue QR codes based on the personal information entered by the user who intends to receive a QR code for membership registration and the telecommunication company's identity verification results, the determination and responsibility of and for false information are ambiguous.

Furthermore, although there should be no difference between a domestic measure and measures of foreign nationals to prevent the spread of infectious diseases such as COVID-19, there is also the problem that foreigners cannot apply for identity verification by telecommunication companies, making it difficult to obtain a QR code through the above-mentioned scheme.

Accordingly, the integrated system 10 according to one embodiment of the present disclosure is capable of issuing the QR codes based on forgery and falsification detection technology of the ID cards without prior actions such as membership registration into the QR code issuing organization, and thus may easily issue the QR code to both Koreans and foreigners in a non-distinguishing manner.

Furthermore, in the integrated system 10 according to one embodiment of the present disclosure, the scanner 305 may be combined with biometric authentication means such as facial recognition technology, iris recognition technology, and vein recognition technology to accurately identify users who wish to receive the QR code.

However, the identity authentication scheme of the telecommunication company to which the first terminal 30 has subscribed cannot be excluded. Thus, a first scheme of generating a QR code by combining identity verification based on the ID card and biometric authentication with each other, and a second scheme of generating a QR code based on identity verification of the telecommunication company of the first terminal 30 and the member information of the QR code issuing organization may be selectively applied. Thus, the difficulties in issuing the QR codes may be resolved, and more accurate identity authentication may become possible. Thus, problems such as false input in the entry register may be solved. Further, the kiosk 50 according to one embodiment of the present disclosure transmits the user information and the location information of the kiosk 50 to the management company server (S403). In this regard, step S403 is intended to include both the user information and the information about the kiosk 50 into the first QR code, and the location information of the kiosk 50 may be an identification value based on which the server may identify the kiosk 50, or a coordinate value of the kiosk 50.

Then, the server 20 according to one embodiment of the present disclosure generates the first QR code based on the user information and the location information of the kiosk 50 (S405).

In this regard, the server 20 may encrypt and store the first QR code, the user information corresponding to the first QR code, and the location information of the kiosk 50.

Then, the server 20 according to one embodiment of the present disclosure transmits the first QR code to the first terminal 30 (S407).

The steps S401 to S407 as described above describe the process in which the server generates the first QR code for the kiosk 50 in order for the user to enter the place where the kiosk 50 is installed for the first time. Hereinafter, a process in which the user uses the first QR code through steps S409 to S417 is described.

The user who intends to enter a place where the kiosk 50 according to one embodiment of the present disclosure is installed manipulates the first terminal 30 to display the first QR code on the display thereof and allows the first QR code to be recognized by the QR code reader 303 of the kiosk 50 (S409).

Then, the kiosk 50 according to one embodiment of the present disclosure interprets the first QR code (S411). In this regard, in the step S411, the location information of the kiosk 50 and the user information included in the first QR code are extracted, and whether the first QR code corresponds to the kiosk 50 is determined. Through steps S413 and S415 as described later, whether the first QR code has been generated by the server 20 is checked.

Then, the kiosk 50 according to one embodiment of the present disclosure transmits an access authentication request based on the first QR code to the server 20 (S413), and the server 20 transmits the user information corresponding to the first QR code to the kiosk 50 (S415).

Then, the kiosk 50 according to one embodiment of the present disclosure compares the user information extracted through the above step S411 with the user information received from the server 20 and determines whether the access of the user is to be permitted based on the comparing result (S417).

In this regard, in the above step S417, it may be determined whether the first QR code has been generated by the server 20 based on the information corresponding to the first terminal 30 and the kiosk 50.

The electronic access management system 10 according to one embodiment of the present disclosure may accurately extract the user's identity information through the above-described operation, determine whether the access is permitted, or create an access list. However, the above-described operation has no configuration to solve the spoofing problem which may occur when the first QR code is not output from the first terminal 30 that has generated the first QR code, but is printed on the paper or when an image file saved as a screenshot is displayed on another first terminal 30.

A solution to the above-mentioned spoofing problem will be described later with reference to FIG. 5.

FIG. 6 is a flowchart showing the operation of the integrated system according to one embodiment of the present disclosure.

A purpose of the operation may be to prevent the spoofing based on a first QR code and a second QR code. The spoofing refers to the act of disguising a spoofing person as someone else's identity for an intentional act and refers to an attack that bypasses access control by accessing the system via forgery of the identity of an authorized user or falsifying an address on the network as an authorized address. By way of example, even when the first QR code is truly generated through the server 20, the user who allows the first QR code to be recognized by the kiosk 50 may not be the user corresponding to the first QR code.

A general QR code reader 303 cannot distinguish whether the QR code is output from the first terminal 30, printed on the paper, or is output from another first terminal 30. Therefore, the integrated system according to the present disclosure seeks to solve the spoofing problem by including a configuration that may prevent spoofing even through the general QR code reader 303.

Referring to FIG. 5, a user who intends to enter a place where a kiosk 50 according to one embodiment of the present disclosure is installed manipulates the first terminal 30 to display the first QR code on the display of the first terminal 30 and allows the first QR code to be recognized by the QR code reader 303 of the kiosk 50 (S501).

Then, the kiosk 50 interprets the first QR code (S503).

In this regard, in the step S503, the kiosk extracts the location information of the kiosk 50 and the user information included in the first QR code and, and checks whether the first QR code corresponds to the kiosk 50.

Then, the kiosk 50 transmits an access authentication request based on the first QR code to the server 20 (S505).

Then, the kiosk 50 requests current location coordinates of the first terminal 30 corresponding to the first QR code to the first terminal 30 corresponding to the first QR code (S507).

Then, the first terminal 30 transmits the current location coordinates thereof to the server 20 (S509).

In this regard, the steps S507 and S509 are intended to check whether the first QR code is output from the first terminal 30 of the genuine user. In this regard, the server 20 first compares the current location coordinates of the first terminal 30 and the location coordinates of the kiosk 50 with each other. When a distance between the first terminal 30 and the kiosk 50 exceeds a threshold, the server may determine that the first QR code is not output from the first terminal 30.

Then, the server 20 according to one embodiment of the present disclosure generates the second QR code based on current standard time information and the current location coordinates received from the first terminal 30 (S511).

In this regard, in the step S511, the server generates the second QR code based on the current standard time information and the current location coordinates received from the first terminal 30. This step is to generate the second QR code randomly but in consideration of the information about the time of requesting the authentication to prevent the forgery.

Furthermore, in the step S511, the second QR code may be generated so as to have the same version and the same size as those of the first QR code. This is to facilitate creation of an overlay QR code by merging the first QR code and the second QR code with each other, as will be described later.

Then, the server 20 according to one embodiment of the present disclosure transmits the user information corresponding to the first QR code and the second QR code to the kiosk 50 (S515), and transmits the second QR code to the first terminal 30 (S517).

Then, the kiosk 50 according to one embodiment of the present disclosure merges the first QR code and the second QR code with each other to generate a second overlay QR code (S517). The first terminal 30 according to one embodiment of the present disclosure merges the first QR code and the second QR code with each other to generate a first overlay QR code (S519).

In this regard, each of the first overlay QR code and the second overlay QR code may be generated by overlapping the first QR code and the second QR code with each other. In more detail, each of the first overlay QR code and the second overlay QR code may be created by positioning position detection patterns of the first QR code and the second QR code on the same axis, and comparing cells of the first QR code and cells of the second overlay QR code with each other and setting identical cells as black cells and non-identical cells as white cells in the overlay OR code.

The first overlay QR code and the second overlay QR code may be randomly generated, and may be generated in an identical manner with each other. Each of the first overlay QR code and the second overlay QR code may be generated by combining the first QR code and the second QR code with each other in various schemes.

Then, the user of the first terminal 30 allows the first overlay QR code generated thereby to be recognized by the QR code reader 303 of the kiosk 50 (S521).

In this regard, the S521 step is a separate step from the S501 step, but is an extension of the S501 step. While the user allows the first QR code displayed on the display of the first terminal 30 to be recognized by the QR code reader 303, the steps S503 to S519 are performed such that the first overlay code QR is displayed on the display of the first terminal 30, and then is recognized by the QR code reader 303.

Then, the kiosk 50 compares the user information extracted through the above step (S503) with the user information received from the server 20 and determines whether the user access is permitted based on comparing result. Thus, the server determines whether the first QR code has been generated by the server 20 based on the information corresponding to the first terminal 30 and the kiosk 50. The server determines whether spoofing occurs based on the determination result about whether the first overlay QR code and the second overlay QR code are identical with each other (S523).

When the first QR code is printed on the paper, the first overlay QR code cannot be recognized by the kiosk 50. Thus, this action may be determined to be the spoofing action and thus the access may not be approved.

Additionally, one embodiment of the present disclosure may further include the following features.

The user may input an identification card (e.g., resident registration card, driver's license, employee ID card, student ID card, business card, etc.) and the passport through the input module 230 of the kiosk 50 or may allow the ID card to be recognized by the kiosk. The kiosk may transmit the image and/or video corresponding to the input and/or recognized ID card or passport to the server 20.

Only when the determination result about the forgery or alteration of the ID card or passport is that the ID card or passport is genuine, the server 20 may compare the photo on the ID card or passport with the liveness face capture photo from the camera installed in the kiosk 50 using an object recognition algorithm and/or an artificial intelligence (AI)

facial recognition algorithm. Thus, a powerful non-face-to-face identity authentication scheme that allows immediate membership registration of an unspecified number of people, including Koreans as well as foreigners, without prior membership registration may be provided, compared to the existing simple facial photo comparison scheme in which the face photo taken in the membership registration is registered and used for access or service use authentication. In this approach, an AI facial recognition algorithm may determine whether the photo obtained by the scanner recognizing a medium having the photo such as a student ID card or business card other than the ID card issued by a nationally recognized institution matches the face photo taken with the camera installed in the kiosk 50. Thus, the medium having the photo such as a student ID card or business card other than the ID card issued by a nationally recognized institution may be used as the alternative (FACE ID) to the identification card for access and service use. Thus, an identity authentication scheme may be provided in even in countries where there is no official ID and the financial system is poor due to the lack of identity verification. Further, the FACE ID may be used for the access and the financial service.

The object recognition algorithm is based on various algorithms for extracting object features such as HOG (Histogram of Oriented Gradient), Haar-like feature, Co-occurrence HOG, LBP (local binary pattern), FAST (features from accelerated segment test), etc. An outline of an object included in an image, video, image information, and/or video information, or text that may be extracted from the object (or an outline (or contour) representing information) may be obtained using the object recognition algorithm.

In addition, fingerprints, iris, and palm veins may be used as bio-authentication means for non-face-to-face identity authentication in the kiosk 50. However, there is the inconvenience of not being able to perform comparison of the bio-authentication means and authentication based on the comparing result, without prior registration of the bio-authentication means under the customer's consent. The facial recognition through the configuration of the present disclosure may be efficient for immediate authentication.

A server 200 operating in an object detection mode varying according to a predetermined condition will be described again below.

In one example, when the image information and/or video information indicates that the detection target object is a single object, and information about the number of RGBs has a value higher than a predetermined threshold (e.g., an integer value between 0 and 150), the server 200 may operate in a first object detection mode or may be set to the first object detection mode. The server 200 operating in the first object detection mode or set to the first object detection mode may detect objects included in images, videos, image information, and/or video information using various recognizers such as Logistic Regression, Support Vector Machine (SVM), and Latent Support Vector Machine (SVM). Thus, the object information may be created (and/or acquired).

In another example, when the image information and/or video information indicates that the detection target object is a single object, and the information about the number of RGBs has a value equal or lower than the predetermined threshold (e.g., an integer value between 0 and 150), the server 200 may operate in a second object detection mode or may be set to the second object detection mode. The server 200 operating in the second object detection mode or set to the second object detection mode may replace the image part model with a part model based on an image-motion mixed feature in the deformable part model and thus may perform modeling on the object having regular movement to separate a moving object from the background. Therefore, the object detection device may generate (and/or obtain) the object information by detecting objects having the regular movement, such as a rotating car wheel or a walking person's legs.

In still another example, when the image information and/or video information indicates that the detection target object includes a plurality of objects (in this case, comparison between the information about the number of the RGBs and the predetermined threshold value is not considered), the server 200 may operate in a third object detection mode or may be set to the third object detection mode. The server 200 operating in the third object detection mode or set to the third object detection mode may obtain object information by extracting an object included in an image, video, image information, and/or video information. The server 200 operating in the third object detection mode or set to the third object detection mode may obtain an outline of an object included in an image, video, image information, and/or video information, or text that may be extracted from the object (or an outline (or contour) representing information) using various algorithms for extracting object features such as HOG (Histogram of Oriented Gradient), Haar-like feature, Co-occurrence HOG, LBP (local binary pattern), and FAST (features from accelerated segment test). In addition, the server 200 operating in the third object detection mode or set to the third object detection mode may recognize (or identify) an object included in an image, video, image information, and/or the video information through video analysis, and may perform a masking process on an area corresponding to the recognized object to generate masking image information. In this regard, the masking process may extract and/or obtain the object information using a scheme of extracting an object candidate area corresponding to the object via background modeling to separate the object from the background, such as background subtraction, MOG (Model of Gaussian) algorithm using GMM (Gaussian Mixture Models), codebook algorithm, etc.

FIG. 7 is a block diagram showing a control module according to one embodiment of the present disclosure.

Referring to FIG. 7, a first control module 110 of the server 20 may include an artificial intelligence module 610 and a blockchain module 620.

The artificial intelligence module 610 may analyze the user's movements and determine whether the spoofing action occurs based on an artificial intelligence network. Furthermore, the artificial intelligence module 610 may perform machine learning on big data stored in a storage module 150 to analyze the user's movements and determine whether the spoofing action occurs.

Furthermore, the artificial intelligence module 610 may train an artificial intelligence network using the big data stored in the storage module 150 of the server 20 as an input variable. For example, the artificial intelligence module 610 may perform learning to derive an accurate correlation using deep learning as a field of machine learning.

Additionally, the artificial intelligence module may calculate the weights of a plurality of inputs to the function via deep learning. Furthermore, various models such as RNN (Recurrent Neural Network), DNN (Deep Neural Network), and DRNN (Dynamic Recurrent Neural Network) may be used as artificial intelligence network models for such learning.

In this regard, RNN is a deep learning technique that simultaneously considers current and past data. Recurrent Neural Network (RNN) represents a neural network in which the connections between units that make up the artificial neural network constitute a directed cycle. Furthermore, various schemes may be used to construct the recurrent neural network (RNN). For example, representative examples thereof include Fully Recurrent Network, Hopfield Network, Elman Network, ESN (Echo state network), LSTM (Long short term memory network), Bi-directional RNN, CTRNN (Continuous-time RNN), hierarchical RNN, and second-order RNN, etc. Furthermore, a scheme for training the recurrent neural network (RNN) may include schemes such as gradient descent, Hessian Free Optimization, and Global Optimization Method.

The blockchain module 620 may generate QR code block data based on information representing the QR code so that the QR code may be transmitted to another network node (e.g., the first terminal 30) based on blockchain technology. The QR code block data generated by the blockchain module 620 may be transmitted to the first terminal 30 through the communication module 120. Additionally, the server 20 may store at least one element included in the grouped information (representing the QR code) and/or the QR code block data in the blockchain.

In general, the blockchain refers to a distributed storage that is created and managed by a peer-to-peer (P2P) network and cannot be forged and/or tampered. The blockchain refers to a collection of data blocks created through transactions (unit operations between two parties that cannot be divided) connected one after another in the form of a chain. Because the previous block is encrypted into the next block in succession and data agreed upon by more than half of the users is recognized as actual data, data once recorded therein cannot be forged and/or altered. A representative application example of the blockchain is Bitcoin as a decentralized electronic currency that records the cryptocurrency transaction process. Blockchain may store therein confirmed transaction details that occur between users for a certain period of time. Many users have own copy of the blockchain, and the transaction history may be revealed to everyone. In this way, only transaction details agreed to by more than half of the users are recognized as actual data, and may be stored permanently as a block.

In this regard, each of the server 20, the first terminal 30, the second terminal 40, and/or the kiosk 50 of the present disclosure may be a blockchain node that includes the blockchain or may control block data. For example, the server 20 may group and/or hash the QR code, the user information, the user terminal information, the kiosk information, etc. received from the kiosk 50 and store the hashing result in the blockchain, then may verify or determine the forgery and/or falsification of the QR code, the user information, the user terminal information, the kiosk information, etc. In an example, the blockchain module 620 may generate QR code block data including a Merkle hash based on the information representing the QR code, and may group information representing a plurality of QR codes so that the generated Merkle hash is included therein.

The server 20 may convert contents (e.g., the QR code block data including the Merkle hash based on the information representing the QR code) to be stored in the storage module 150 into a blockchain transaction and may transmit the blockchain transaction to other blockchain nodes participating in the blockchain network. The information representing the QR code to be stored in the blockchain transaction may include a Merkle hash identifier, a group identifier, and/or an identifier of a previous group.

The server 20 may compare at least one element stored in the blockchain and at least one element included in the information representing the grouped QR code with each other, based on at least one of a predetermined time and the other, based on at least one of a predetermined time and the number of information representing the stored QR code, and may verify integrity of the information representing the stored QR code based on the comparing result. When the information representing the stored QR code has not integrity, the server 20 may output the integrity status through the output module 140.

When the information representing the QR code stored in the storage module 150 is forged and/or altered or damaged, the server 20 may output the integrity status through the output module 140 to allow the administrator (e.g., a second user) who manages the server 20 to know that the information representing the QR code stored in the storage module 150 is forged and/or altered or damaged. The control module 110 may generate a certificate to determine the integrity of the stored blockchain and transmit the generated certificate to another blockchain node. The certificate may include information representing the stored at least one QR code, information representing the grouped QR code, and information representing the stored blockchain. The certificate may be used by the server 20 to determine the integrity of information representing a matching score.

Upon receiving request of at least one element of the stored blockchain i) through a website and/or mobile app that provides or supports an information provision service indicating the QR code of the present disclosure and/or (ii) from another blockchain node, the control module 110 may i) output the requested at least one element through the website and/or mobile app, and/or ii) may transmit the requested at least one element to another blockchain node.

Additionally, the integrated system according to one embodiment of the present disclosure may further include the following features.

The integrated system 10 according to one embodiment of the present disclosure may include the blockchain-based kiosk 50, the server 20, the first terminal 30, and the scanner 305. However, the integrated system 10 as shown in FIG. 1 may be only one embodiment of the present disclosure, and the present disclosure may not be interpreted in a manner as limited by FIG. 1.

In this regard, the plurality of components as shown in FIG. 1 may generally be connected to each other based on a network. For example, as shown in FIG. 1, the kiosk 50 may refer to an affiliate terminal installed in an affiliated store that uses the operating method of the system 10 according to one embodiment of the present disclosure, and may be connected to the server 20 based on the network. Furthermore, the server 20 may be connected to the kiosk 50, the first terminal 30, and the scanner 305 based on a network. Furthermore, the first terminal 30 may be connected to the server 20 based on a network. Furthermore, the scanner 305 may be connected to the server 20 and the first terminal 30 based on a network.

In this regard, the network may refer to a connection structure that allows information exchange between nodes, such as a plurality of terminals and servers. For example, the network may include radio frequency (RF), 3rd Generation Partnership Project (3GPP) network, long term evolution (LTE) network, 5th Generation Partnership Project (5GPP) network, World Interoperability for Microwave Access (WIMAX) network, Internet, LAN (Local Area Network), Wireless LAN (Wireless Local Area Network), WAN (Wide Area Network), PAN (Personal Area Network), Bluetooth network, NFC network, satellite broadcasting network, analog broadcasting network, DMB (Digital Multimedia Broadcasting) network, etc. However, the present disclosure is not limited thereto.

The kiosk 50 according to one embodiment of the present disclosure may refer to a device that may receive the cryptocurrency through a wallet address created per each user based on a web page, app page, program, or application related to blockchain-based financial services, and may perform payment processing for products with a price corresponding to the cryptocurrency. In this regard, the kiosk 50 may mean not only a kiosk, but also a terminal or device that may check the authenticity of an ID card or passport and may check the deposit of cryptocurrency through network communication and may pay the bill.

Furthermore, when the user selects the type of language, the kiosk 50 may change the type of language displayed on the screen or output in sound so as to correspond to the language selected by the user.

Furthermore, the kiosk 50 may refer to a device that may look up and output real-time prices of the currency and cryptocurrency selected by the user when the user selects the type of the cryptocurrency and currency.

Furthermore, the kiosk 50 according to one embodiment of the present disclosure may refer to a device that not only may determine the authenticity of documents of the user's identity such as an ID card or passport scanned from the scanner 305 through the server 20, but also may verify whether the user is an adult and thus determine whether the user may be the subject of a transaction.

Furthermore, the kiosk 50 may refer to a device that may calculate the quantity of cryptocurrency corresponding to the price of the product the user wants to purchase or the amount of money to be exchanged, based on the market price of the cryptocurrency as selected by the user, and may create a wallet address for each user to which the calculated amount of cryptocurrency is to be deposited, and outputs the wallet address as an identification code.

Further, the kiosk 50 may refer to a device which may check whether the deposit has been made to the wallet address output as the identification code through the user's first terminal 30, and when the deposit has been made, may issue a deposit receipt and may complete the payment process. In this regard, a separate server 20 may not be required when the kiosk 50 performs processes such as checking the current price of the cryptocurrency or checking whether the deposit has been made to the wallet address on its own. It is obvious that depending on an embodiment, the roles of the server 20 and the kiosk 50 may be respectively allocated thereto or may be integrated into one component.

Furthermore, the kiosk 50 may refer to a server that transmits all transaction-related data for payment of product prices to the server 20, such that the server acts as a distributed ledger, and performs inventory management, and member management based on a private blockchain.

In this regard, the kiosk 50 may be embodied as a computer that may access a remote server or terminal through a network. For example, the computer may include a navigation, a notebook computer equipped with a web browser, a desktop computer, a laptop computer, and the like. In this regard, the kiosk 50 may be embodied as a terminal that may connect to a remote server or terminal through a network.

In other words, the kiosk 50 may be embodied as a wireless communication device that has portability and mobility, and may include all types of handheld-based wireless communication devices, such as, for example, the navigation, PCS (Personal Communication System), GSM (Global System for Mobile communications), PDC (Personal Digital Cellular), PHS (Personal Handyphone System), PDA (Personal Digital Assistant), IMT (International Mobile Telecommunication)-2000, CDMA (Code Division Multiple Access)-2000, W-CDMA (WCode Division Multiple Access), Wibro (Wireless Broadband Internet) terminals, smartphones, smartpads, tablet PCs, etc.

Furthermore, the server 20 may refer to a server that provides a blockchain-based financial service web page, app page, program, or application. Further, when the kiosk 50 creates the wallet address as an account that will receive the user's deposit, and provides the wallet address as the identification code, the server 20 may be a server that checks whether the deposit has been made to the generated wallet address.

However, as described above, when the kiosk 50 performs processes such as checking the current price of the cryptocurrency or checking whether the deposit has been made to the wallet address on its own, the server may not exist or may only perform the role of managing a plurality of kiosks.

Further, when the cryptocurrency is deposited from the first terminal 30 to the generated wallet address, the server 20 may be a server that deducts the exchange fee, and may be a server that updates the ledger of the node in the blockchain.

Furthermore, when the scanner 305 pre-linked with the kiosk 50 performs processes such as authenticity determination and adult authentication, the server 20 may be a server which determines ID card authenticity and adult status of the user and feeds the determination result back to the kiosk 50. Further, the server 20 may be a server that stores the type and the number of products sold at each of kiosks respectively existing in a plurality of branches as a log and manages membership.

In this regard, the server 20 may be embodied as a computer that may access a remote server or terminal through a network. For example, the computer may include a navigation, a notebook computer equipped with a web browser, a desktop computer, a laptop computer, and the like. The first terminal 30 may be a terminal of a user using the blockchain-based financial service-related web page, app page, program, or application.

Further, the first terminal 30 may be a terminal for a foreigner or domestic person who wants to purchase a product using cryptocurrency. Furthermore, when the kiosk 50 generates the wallet address and outputs the identification code including the wallet address information and cryptocurrency quantity information, the first terminal 30 may be a terminal that scans or reads the output identification code and transfers the user's cryptocurrency to the corresponding electronic wallet. In this regard, the type of cryptocurrency may be Bitcoin, but is not limited thereto.

Furthermore, the scanner 305 may be a device that scans the ID card or passport of a member or user who intends to enter an affiliated store providing the financial service to check the authenticity of the ID card or the passport and the adult status of the member or the user. In this regard, when it is determined that the user who intends to enter the affiliated store has the membership, in conjunction with the affiliated store's door opening and closing device (not shown), the scanner 305 may be a device that outputs a door opening or access permission signal to the door opening and closing device. In this regard, the scanner 305 may be formed integrally with the kiosk 50 according to one embodiment of the present disclosure.

For example, when the kiosk is an IoT vending machine, the scanner may be formed in an integrated manner with the kiosk. When the kiosk 50 and an access location are spaced from each other (for example, in a place such as an unmanned convenience store), the scanner may be installed separately from the kiosk. However, it is obvious that the present disclosure is not limited thereto and various embodiments may be possible. In this regard, the scanner 305 may be embodied as a computer that may access a remote server or terminal through a network. As described above, the computer may include, for example, a navigation, a notebook equipped a web browser, a desktop, a laptop, etc.

The kiosk 50 included in the integrated system 10 according to one embodiment of the present disclosure as described above may perform basic functions or roles to provide the blockchain-based financial service as described above, and may include a plurality of components to perform the basic functions or roles to provide the blockchain-based financial service as described above.

However, in general, when the cryptocurrency is used for the payment service or currency exchange services through the blockchain-based financial service provision method, a confirmation procedure in relation to the use of cryptocurrency may be required. In this way, the confirm procedure that must be performed in connection with the use of the cryptocurrency may take a certain amount of time or an irregular amount of time for the procedure to be processed.

In the financial service provision system 1 according to one embodiment of the present disclosure, the kiosk 50 may use cryptocurrency for currency exchange to reduce the processing time of the confirm procedure performed in connection with the use of cryptocurrency. Hereinafter, it may be described how the cryptocurrency kiosk 50 according to one embodiment of the present disclosure provides financial services by minimizing the delay in a processing time using cryptocurrency for currency exchange. In addition, the cryptocurrency used for currency exchange in the present disclosure may be referred to as 'DPEC (Digital Payment Exchange Coin)' or 'D Coin', but may not necessarily be limited thereto.

Specifically, when the type of language is selected by the user, the kiosk 50 according to one embodiment of the present disclosure may provide financial services based on the type of language as selected. For example, when Korean is selected by the user on kiosk 50, the kiosk 50 may operate such that the language output through the input/output unit (e.g., may mean a display device such as a screen, etc.) of the kiosk 50 is converted to Korean.

Furthermore, when the type of currency is selected by the user, the kiosk 50 may provide financial services based on the selected type of currency. For example, when the Korean won is selected as a type of currency by the user, the kiosk 50 may operate to convert the currency which may be input through the input/output unit of the kiosk 50 into won.

Afterwards, the kiosk 50 may receive a transaction amount related to a payment service or currency exchange service from a user using a financial service, and calculate the quantity of the cryptocurrency corresponding to the input transaction amount. In this regard, the kiosk 50 may operate based on the type of language and the type of currency pre-selected by the user. Afterwards, the kiosk 50 may output the wallet address to which the calculated amount of cryptocurrency will be transferred as an identification code, and may check whether the quantity of the cryptocurrency may be deposited to the wallet address through the user terminal of the user who read or scanned the identification code. When the cryptocurrency has been deposited, the kiosk may create and output a deposit event.

Afterwards, when the deposit event has been output, the kiosk 50 may transfer the calculated quantity of cryptocurrency minus the fee to the cryptocurrency exchange with the highest trading price among the plurality of cryptocurrency exchanges. In this regard, the kiosk 50 may transmit the cryptocurrency to the cryptocurrency exchange through the network.

At the same time, the kiosk 50 may check whether the transaction history of the user's wallet address exists. In this regard, the kiosk 50 may check whether the transaction history of the user's wallet address exists through the server 20. Afterwards, the kiosk 50 may perform its own confirm procedure based on the presence or absence of the transaction history of the user's wallet address.

For example, when there is a transaction history of the user's wallet address, the kiosk 50 may determine zero-confirmation. On the other hand, when there is no transaction history of the user's wallet address, the kiosk 50 may perform a series of predefined confirm procedures before determining the zero-confirmation. In this regard, the series of predefined confirm procedures may be performed by predefined program commands within the kiosk 50.

It has been described above that the kiosk 50 performs its own confirm procedure based on the transaction history of the user's wallet address. However, the present disclosure may not necessarily be limited thereto. In other words, the kiosk 50 may perform its own confirm procedure based on absence or presence of the recent transaction history corresponding to a preset period, rather than the absence or presence of the transaction history of the user's wallet address. Alternatively, kiosk 50 may perform its own confirm procedure based on whether the user's wallet address is normal, rather than whether the user's wallet address has the transaction history. In this regard, a condition based on which whether the wallet address is normal may be predefined.

As described above, the kiosk 50 according to one embodiment of the present disclosure may determine whether to proceed with a transaction event based on its own confirm procedure. This may have a significant effect in reducing the time of general confirm procedures that are essential to provide payment and exchange services based on cryptocurrency.

In this regard, the kiosk 50 may not only consider trading prices of multiple cryptocurrency exchanges, but also consider stability against price volatility of cryptocurrency exchanges. For example, the kiosk 50 may periodically check factors that may determine the stability, such as the decline of the trading prices of the multiple cryptocurrency exchanges, and may determine the cryptocurrency exchange to which the kiosk will transmit the cryptocurrency, based on the checking result.

Afterwards, the kiosk 50 may scan the ID card or passport through the scanner 305 that is pre-linked with the kiosk 50. Afterwards, the kiosk 50 may check the user's identity based on a determining result of whether the scanned ID card or passport has been forged or altered. When the confirm procedure of the financial service has been normally completed, the information on the ID card or passport may be deleted from the kiosk. In this regard, the point at which information about the ID card or passport is deleted therefrom may be preset in the kiosk 50.

When, through the above method, the kiosk 50 determines that the user is genuine based on a determining result of whether the scanned ID card or passport of the user has been forged or altered, the kiosk may sell the cryptocurrency in a quantity corresponding to the transaction amount, and may sell the cryptocurrency for currency exchange corresponding to the transaction amount converted to the cryptocurrency at a cryptocurrency exchange in which the cryptocurrency for currency exchange is traded. Afterwards, the kiosk 50 may transfer the amount obtained through the sale of the cryptocurrency for currency exchange to an account of an operator who runs the affiliated store where the kiosk 50 is installed.

The kiosk 50 according to one embodiment of the present disclosure may operate so that financial services may be provided so as to prevent the risk of a fall in the cryptocurrency for currency exchange in advance. Specifically, when the drop in the cryptocurrency for currency exchange is greater than a preset reference, the kiosk 50 may operate to perform a circuit break to prevent additional transaction services or exchange services from being performed.

Referring to FIG. 3, when the type of language is selected by the user through the third input module 230, the third output module 240 of the kiosk 50 may change the language of the screen to the selected language. In this regard, in the case of unmanned stores or vending machines, the user inputs the language thereto. However, in the case of manned stores, the language may be input by the person operating the kiosk 50. In this way, the third input module 230 may receive the language type and currency type selected by the user, and the third output module 240 may output the current price of the cryptocurrency in the selected type of currency on the screen. The third output module 240 may output the quantity of cryptocurrency corresponding to the payment or exchange of the input transaction amount, and the third output module 240 may output the wallet address to which the cryptocurrency is to be transferred as the identification code.

For example, it is assumed that the kiosk 50 is an IoT vending machine and is located in Korea, and that A from the United States travels to Korea and purchases a movie ticket. In this regard, it is assumed that each movie ticket is 10,000 won, that each ticket is worth 1 cryptocurrency, and that there are no other type of the cryptocurrency. Then, when the current dollar price of 1 cryptocurrency is $10, the third output module 240 may display that the current price of the cryptocurrency is 1 cryptocurrency=10 dollars and displays that one ticket is worth 1 cryptocurrency. Furthermore, when A selects 10 tickets and an electronic wallet address to which 10 cryptocurrencies corresponding to $100 is to be deposited is created, the third output module 240 may output an identification code containing information indicating the depositor A and 10 cryptocurrencies. In this regard, the identification code may be a QR code. However, it is obvious that depending on an embodiment, the identification code may be embodied as another type of an identification code such as a barcode.

In other words, the third output module 240 looks-up the market price of the cryptocurrency with the type of currency selected through the third input module 230. The third output module 240 may output the transaction amount that the user intends to pay or exchange, and the looked-up market price of the cryptocurrency. The kiosk may generate the wallet address to which the cryptocurrency will be deposited to exchange the quantity of cryptocurrency corresponding to the transaction amount entered through the third input module 230 and may output the generated wallet address as the identification code through the input/output unit 110. In this regard, the third control module 210 may calculate the quantity of cryptocurrency corresponding to the transaction amount input from the user through the third input module 230. The third control module 210 and/or the third communication module 220 may transfer the remaining amount of the cryptocurrency excluding the fee from the calculated quantity of the cryptocurrency to the cryptocurrency exchange with the highest trading price among the plurality of cryptocurrency exchanges.

The third control module 210 may check whether the amount of cryptocurrency output to the wallet address has been deposited through the user terminal of the user who read or scanned the identification code. When the cryptocurrency has been deposited, the third control module 210 may generate the deposit event and output the generated deposited event to complete payment processing. In this regard, the third control module 210 may access the wallet address on its own to check whether or not the deposit has been made. However, as described above, depending on an implementation, the third control module 210 may only obtain a result value about whether the deposit has been made as checked by the server 20.

In one example, the third control module 210 may have its own confirm procedure based on the presence or absence of transaction history of the user's wallet address.

Furthermore, upon determination that the user is genuine based on a determining result of whether the ID card or passport of the user has been forged or altered, the third control module 210 may sell the cryptocurrency in a quantity corresponding to the transaction amount, and may sell the cryptocurrency for currency exchange corresponding to the transaction amount converted to the cryptocurrency at a cryptocurrency exchange in which the cryptocurrency for currency exchange is traded.

Thereafter, the third control module 210 may transfer the amount obtained through the sale of the cryptocurrency for currency exchange to the account of the operator who operates the affiliated store where the service provision device is installed. Additionally, the third control module 210 may further perform the function of printing a receipt. For example, when the deposit event is output, the third control module 210 may print a receipt indicating the sum of the input transaction amount and the blockchain fee. In this regard, the third control module 210 may print a receipt print list including the serial number of the kiosk 50, transaction date and time, the wallet address, a coin quantity, a product quantity, and a transaction amount converted to the selected type of currency. In this regard, the coin in the coin quantity does not refer to a specific cryptocurrency, but is defined as a term referring to the unit of cryptocurrency. In this regard, the identification code may include information about the wallet address and the quantity of coins to be deposited.

In the process as described above, the third control module 210 may control each of the components of the kiosk 50, transmit input/output signals, and perform overall input/output management and control command signals.

When it is determined that the ID card or passport is an original that has not been forged or altered based on a result of determining whether it has been forged or altered using the scanner 305, the identity check may be completed. In this regard, the scanner 305 may perform adult authentication as well as checking of the forgery and alteration. Accordingly, the forgery or alteration may be determined through infrared (IR) and hologram (OVD), and the scanner 305 may perform the adult authentication using OCR of the resident registration number or date of birth of the scanned passport or ID card.

In this regard, the method for determining whether an ID card has been forged or altered and for adult authentication as performed in the scanner 305 may include checking the validity of the identity information written on the ID card, an infrared test that calculates and compares the infrared ray transmission value scanned from an infrared lamp, and ultraviolet ray inspection which calculates and compares the ultraviolet ray reflection value scanned from the ultraviolet lamp. Accordingly, the acquired image data is automatically saved, so that there is no need to prepare a copy of the ID card. The information obtained through OCR (Optical Character Reader) processing is automatically stored in the database, so that the input process for entering personal information may be unnecessary.

The scanner 305 may be installed in the entrance area in conjunction with the kiosk 50 and may control the opening and closing of the door of the affiliated store so that members may access the affiliated store, and may also determine whether the user's ID card or passport has been forged and altered to complete the identity check. In this regard, door opening may be permitted through adult authentication. Even when the user is an adult, but is not a member, the user may not be allowed to open the door to prevent access. This is a configuration that may vary depending on various embodiments in which an object allowed to access to the affiliated store varies. Thus, it is obvious that the present disclosure is not limited to the above-mentioned condition.

The kiosk 50 may be one node among a plurality of nodes in a blockchain. In this regard, referring to Bitcoin among cryptocurrencies, Bitcoin is a type of electronic payment method using electronic signatures (encryption protocol) and the Internet. Instead of relying on real assets such as gold and the credit power of issuing entities such as countries, participants (miners) perform a special calculation called Proof of Work (as an incentive to issue newly created Bitcoins) autonomously and competitively via data transmission and reception in the distributed (Peer to Peer, hereinafter referred to as P2P) network accessed through the Internet, thereby continuously preserving public transaction records on the blockchain with recognized legitimacy. The biggest feature thereof is that the risk of double payment is prevented.

While remittance of legal currency, in principle, needs to be done through intermediaries such as financial institutions and remittance agents, in the case of Bitcoin, the user's electronic wallet functions as an access point in the P2P network, and it is possible to directly trade Bitcoin between the user's electronic wallets. It is clear that Bitcoin is not a traditional currency or legal tender itself issued by a central bank in that there is no specific issuing entity, but the sign acknowledged that Bitcoin has payment value and exchange value. Moreover, as a basis in itself, it may be used as a means of payment and settlement for the resolution of credit-debt relationships and for the movement of funds between distant parties, and performs a similar function to currency and settlement funds. When an ordinary person uses Bitcoin, he or she purchases Bitcoin by paying traditional currencies such as yen and US dollars through an electronic wallet address installed on his or her PC or an address opened on a Bitcoin exchange site. The user may purchase products from online markets where Bitcoin is available, use it in exchange for services, sell it to other users, or exchange it for traditional currency.

The blockchain is largely composed of four basic technologies such as P2P (Peer-to-Peer) network, encryption, distributed ledger, and distributed consensus. In the present disclosure, non-face-to-face cryptocurrency payments are performed using blockchain technology. The technologies have a complementary relationship with each other to main-tain the integrity of data and decentralization, which are the values of blockchain, and act as the basis of the blockchain operation mechanism. Further, smart contract as an application technology in the blockchain environment, is a technology that provides integrity and reliability of the program execution code and its results, and is attracting attention in fields such as automated transactions and control. First of all, connection and communication between blockchain participants are based on a P2P network. A P2P network is a network made up of equal-level participants that breaks away from the existing client-server scheme and is largely classified into structured P2P and unstructured P2P. In particular, unstructured P2P may be divided into a centralized scheme where the network between participants is centered on a server, and a distributed P2P network based on a data flooding algorithm. Blockchain uses an unstructured P2P network based on flooding for a decentralized distributed network, which is the characteristic and ideology of the technology. Additionally, communication in P2P networks is generally done through UDP, but blockchain uses TCP/IP. Therefore, blockchain participants maintain the IPs of participants physically closest to them (in the case of Bitcoin, three IPs are maintained) and use these to send and receive messages and data.

Second, the encryption technology used in blockchain includes ①Merkle Tree for verifying the integrity of data, and ② public key-based digital signature technique for non-repudiation of transactions. A Merkle tree is a type of hash tree and refers to a tree in which the names of all non-leaf nodes are composed of the hashes of child nodes. In other words, leaf nodes point to data such as files or specific values, and the upper node is composed of the hash of these leaf nodes. The root node of the Merkle tree composed of this scheme is composed of the hash value of the data of all leaf nodes constituting the tree, and the user may verify forgery and alteration of data simply by verifying the hash of the root node. Therefore, in the blockchain, transactions and information between participants are inserted into leaf nodes to form the basis of the Merkle tree. There are several hash functions that may be used when creating a parent node, but in blockchain, the SHA-256 function is used to utilize the Merkle tree.

The public key-based digital signature scheme is an encryption technology that enables secure communication between participants who do not previously share a secret key, and is widely used in fields such as identity authentication. In a public key-based structure, there are two key pairs: a public key and a secret key. The public key may be known to all participants, but the corresponding private key must be maintained so that only the owner may know it. This public key-based digital signature scheme is used in blockchain to verify the validity of transactions. A user who intends to generate a transaction signs the transaction using his or her private key and transmits the transaction information to the blockchain network along with his or her corresponding public key. All other participants who receive this transaction information use the sender's public key contained in the transaction to verify the validity of the transaction and thereby check that the transaction was sent by a blockchain participant.

Third, the distributed ledger is a record storage of information that is replicated, shared, and synchronized by agreement between participants. In particular, in order for the distributed ledger to be applied on a P2P network, it has the characteristic that participants' agreement on the records of the distributed ledger is required, and this feature is maintained in blockchain as well. In a blockchain, a distributed ledger records all transactions and information that occurs through a verification process by participants, and all participants maintain the same information. When verifying a transaction or information, first, the connectivity with information already recorded in the distributed ledger maintained by each participant is checked, and only legitimate transactions or information are stored in the distributed ledger of the blockchain after agreement between the participants.

When storing transactions or information, they are accumulated over a certain period of time, stored in units called blocks, and stored in a distributed ledger with connectivity between these blocks. This distributed ledger is the basis for the data integrity guarantee provided by blockchain. Since all users participating in the blockchain maintain data in the same distributed ledger, in order for an external attacker to forge or falsify specific data or attempt double transactions, more than half of the distributed ledgers maintained by participants must be accessed. Because an attack must be attempted, high costs and computing resources are required.

Fourth, distributed consensus is a protocol that elicits agreement on specific data values between processes or agents in order to achieve reliability of the overall system when there is a defective process in fields such as distributed computing and multi-agent systems. The distributed consensus protocol for this has the following characteristics.

First, validity, that is, when all correct processes propose the same data, then all processes make a decision (valid, invalid) on the proposed data. Second, integrity, that is, when all correct processes adopt one data, then that data is the data proposed by another process. Thirdly, Agreement, all good processes must agree on some data, and fourthly, Termination, all good processes must make decisions about some data.

In blockchain, the above distributed consensus protocol is designed and consensus is reached between participants on transactions or information that occurs through it. It is one of the key parts because only appropriate transactions or information through consensus are maintained in the blockchain.

Furthermore, the characteristics of the blockchain are differentiated and the reliability of the system is also affected depending on which scheme of distributed consensus protocol is used. Bitcoin, which may be considered a representative blockchain service, uses a distributed consensus protocol called Proof-of-work. This proof-of-work protocol is a protocol in which participants work to find a specific hash value through a trial-and-error scheme using transactions and data to be stored as blocks and the SHA-256 hash function, thereby reaching agreement on block information among participants. In this regard, blockchain may use a voting-based consensus algorithm called proof-of-stake, and although its security is lower than proof-of-work consensus, it may solve the problems of consensus speed and power waste.

Furthermore, smart contracts may be used in one embodiment of the present disclosure. A smart contract refers to a computer protocol for electronic commerce and is defined as a computer transaction protocol that executes the terms of a contract. The purpose is to minimize intermediaries for trust in transactions, while satisfying contract conditions and minimizing malicious exceptions. Blockchain supports such smart contracts, which enables automated direct transactions between transaction parties without an intermediary or central agency, and ensures the reliability and integrity of transaction information by maintaining both conditions and results in a distributed ledger. In other words, users program a protocol smart contract containing their desired conditions and store it in the blockchain, and when certain conditions are met, the smart contract is verified and executed by other blockchain participants. The execution results are again stored in the blockchain, ensuring the integrity and reliability of information about the transaction results. In particular, automatic and autonomous collaboration and control between devices with computing power is possible with blockchain smart contracts. In contrast to the blockchain described later, the blockchain described above may be defined as a public blockchain.

In addition, the system of the present disclosure may further utilize a private blockchain. The private blockchain may be defined as a network that shares transaction data, member data, purchase data, etc. with each affiliated store as anode. The private blockchain is composed of a network that is not public and is held only between and by the affiliated stores, and its functions may include all of the functions of the blockchain as described above. Further, the private blockchain is an enterprise blockchain in which one company controls everything according to one embodiment of the present disclosure, and may be defined as an existing centralized database with the addition of cryptographic auditability. The private blockchain may be introduced with the purpose of maintaining the role of central management, improving the security of the existing centralized scheme, and solving limitations in process processing. Since the private blockchain is a blockchain designed to be adapted to the purpose and characteristics of specific organizations and companies, it may not implement all of the characteristics of blockchain such as openness and decentralization. However, the private blockchain may implement all of the characteristics as described above. In this regard, since the operating node on the network is limited to each affiliated store in the private blockchain, there is no need to issue coins when the economic foundation for issuing the coins is not established. However, the issuance is not restricted. Furthermore, the private blockchain may be a suitable scheme for distributing and managing data.

Additionally, the integrated system 10 according to one embodiment of the present disclosure may include a plurality of kiosks and may further include the following features.

① A plurality of kiosks may be linked with the server 20 that manages transactions of the plurality of kiosks. Further, the server 20 may apply transaction and purchase data occurring within multiple kiosks to the private blockchain with multiple kiosks as the nodes, and update and manage inventory data from transaction and purchase data. The private blockchain may be a P2P network that shares a distributed ledger among multiple kiosks. In this regard, the distributed ledger shared in the private blockchain may include the functions of the distributed ledger of the blockchain as described above.

In this regard, the server 20 may manage members who may pay with cryptocurrency at multiple kiosks based on a level and age, and may manage the private blockchain by updating the member's mileage and purchase history information.

② Then, the server 20 may manage membership management through ID or passport scanning when the member is entering an affiliated store, and may perform transactions with the blockchain through blockchain engine management, and may perform smart contract by managing the autonomous transaction contracts using the chain code. For example, various servers such as web servers, authentication servers, API servers, wallet servers, administrator servers, etc. may perform operations through service requests to each other, and they may perform operations based on databases.

③ The kiosk 50 may be managed by the server 20 as described above, and when the type of language used to perform a transaction or currency exchange is selected through the input/output unit 110, the language of the screen may be converted to the selected language. In this regard, a user interface that allows selection of language may be placed on the screen of all processes of cryptocurrency payment.

The screen of the kiosk 50 as in ① may switch to a screen where payment is performed when the user clicks or touches the main screen.

④ The kiosk 50 may search for the market price of a cryptocurrency using the selected type of currency through the third input module 230 and output the searched market price of the cryptocurrency to the third output module 240. In this regard, the third output module 240 may display information such as product quantity, product price, cryptocurrency quantity, cryptocurrency transaction and exchange fee, and provisional cryptocurrency total. However, the present disclosure is limited to the listed items.

⑤ The kiosk 50 generates a wallet address to which the cryptocurrency corresponding to the transaction amount entered through the third input module 230 will be deposited, and output the generated wallet address as an identification code through the third output module 240. In this regard, a new wallet address may be created each time a payment is made and a deposit address may be assigned to each customer. However, when the user is a member, the member's unique code may be used. Accordingly, the user (customer) may allow the first terminal 30 to scan or read the identification code including the QR code and to send the cryptocurrency to the wallet address, and at this time, the kiosk 50 allows a QT server (not shown) to continuously check the deposit status. If the deposit is made, the screen thereof will immediately switch to the discharge screen. However, when the deposit (cryptocurrency transfer) is made from the first terminal 30, but the QT server is still checking the deposit status, the kiosk 50 may proceed with the deposit receipt printing process in which the kiosk prints the serial number (machine number), the wallet address, the cryptocurrency quantity, product price, and money amount.

Accordingly, the third control module 210 of the kiosk 50 may check whether the deposit of the output amount of cryptocurrency is made to the wallet address through the first terminal 30 of the user who read or scanned the identification code in the third control module 210. When the cryptocurrency has been deposited, the third control module 210 of the kiosk 50 may create and output a deposit event to control payment completion processing.

It is obvious that the third control module 210 may be responsible for controlling each of the components in addition to the configuration as described above. In this regard, the price of the product is the payment amount based on the amount of the selected currency corresponding to the searched real-time market price of the cryptocurrency. In other words, since the cryptocurrency has high volatility, it is important to check the real-time market price and exchange the cryptocurrency at the real-time market price. The currency exchange may be done based on the amount at the time of inquiry or transaction. It is obvious that depending on the embodiment, a timing at which the cryptocurrency exchange is performed may vary.

It is obvious that while the operating method of the system 10 according to one embodiment of the present disclosure as described above with reference to ① to ⑤ is performed as described above, financial services based on the cryptocurrency for currency exchange as described with reference to FIG. 1 and FIG. 2 may be performed.

Furthermore, the financial services according to one embodiment of the present disclosure may include a currency exchange service, and the kiosk 50 may be applied to an ATM (Automated Teller Machine) that provides the currency exchange service.

First, (a) the kiosk 50 may display a screen so that the user may select the language the user wants to use among the languages of the counties, and when the user selects the language on the screen, the kiosk outputs a numeric keypad as shown in (b) and receives the transaction amount to be exchanged from the user. When the user sets the currency type of the transaction amount to be exchanged, the corresponding amount of cryptocurrency and the fee are displayed, and the total number of cryptocurrency to be paid may be displayed. When the user selects the next button on this screen, the screen switches to a screen as shown in (c). The screen may be displayed asking the customer (user) to send the cryptocurrency to the QR code on the screen.

In this regard, the user may scan the QR code and may transfer cryptocurrency (scan transfer) from the wallet thereof, and kiosk 50 may confirm that the user has made the transfer, and when the corresponding amount of cryptocurrency has been deposited, the kiosk 50 may print a receipt. In this regard, the fee percentage of cryptocurrency is adjustable.

In other words, when the cryptocurrency has been deposited (0 CONFIRM) and only 1 confirmation (total 6 conformations) occurs on the blockchain, the server automatically transfers the amount excluding the blockchain fee to the external wallet (exchange) of the business, and may place a sell order (contract) of the amount received from the exchange business account, and may transfer the sell transaction amount (KRW/KRW) to the kiosk operator account. In addition, it may take at least 10 to 20 minutes or more to complete one confirmation. Thus, for immediate processing, an ID card or passport to check identity in case of an accident may be first recognized and has been checked, and then then the information thereon may be automatically deleted.

In this regard, (e) since the identity check procedure is a procedure for immediate currency exchange and requires a time to check the identity, this may be carried out to prevent accident risks that may occur in the meantime and to track the person involved when an accident occurs. In this regard, when the identity check procedure has been completed normally, the ID or passport information may be automatically deleted. When foreigners apply for a tax refund in an in-city refund machine for foreigners (KIOSK), the kiosk 50 according to one embodiment of the present disclosure may implement stronger procedures to protect personal information, compared to providing credit card information (leaving the country within 100 days).

Afterwards, (f) shows the screen when withdrawal is being made at kiosk 50. CCTV may be further installed at the site in which the kiosk 50 is installed so as to be linked with the kiosk 50 according to one embodiment of the present disclosure. In other words, this may be to prevent withdrawal disputes from occurring. In this regard, the operator of the on-site kiosk 50 may manage cash input through CCTV, and the management program may be configured to check the balance. An ATM usage fee may be charged at 3% of the exchange amount. However, as described above, the fee may vary.

FIG. 8 is a flowchart showing an operation of the integrated system according to one embodiment of the present disclosure.

Referring to FIG. 8, the kiosk may calculate the quantity of cryptocurrency for the transaction amount input from the user using the financial service through the input/output unit of the kiosk (S720).

In addition, the kiosk may transfer, to a cryptocurrency exchange having the highest transaction price among a plurality of cryptocurrency exchanges, a remaining quantity of cryptocurrency excluding a fee from the calculated quantity of cryptocurrency (S720).

In this regard, the operating method may include receiving, by the kiosk, a type of language and a type of currency selected from the user through the input/output unit, and providing, by the kiosk, the financial service based on the selected type of language and the selected type of the currency. In this regard, the operating method may include outputting, by the kiosk, as an identification code, a wallet address to which the calculated amount of cryptocurrency is to be deposited through the input/output unit, checking, by the kiosk, whether the output quantity of cryptocurrency has been deposited to the wallet address through the user terminal of the user reading or scanning the identification code, and generating and outputting, by the kiosk, a deposit event when the cryptocurrency has been deposited.

In this regard, the kiosk may have its own confirm procedure based on absence or presence of the transaction history of the user's wallet address, as described with reference to FIG. 1, and the specific description thereof is the same as described with reference to FIG. 1, and thus may be omitted.

Afterwards, the operating method may include scanning, by the kiosk, the identification card or the passport through a scanner pre-linked to the kiosk, determining, by the kiosk, whether the user is genuine based on the determination result about whether the scanned identification card or passport is forged or falsified, and deleting, by the kiosk, information about the identification card or passport when the confirmation process of the financial service has been normally completed.

Thereafter, the operating method may include, upon determining that the user is genuine based on a determining result of whether the scanned ID card or passport of the user has been forged or altered, selling, by an operating unit for operating a cryptocurrency for currency exchange of the kiosk, the cryptocurrency in a quantity corresponding to the transaction amount (S730).

Further, the operating method may include selling, by the operating unit, the cryptocurrency for currency exchange corresponding to the transaction amount converted to the cryptocurrency at a cryptocurrency exchange in which the cryptocurrency for currency exchange is traded (S740).

Thereafter, the operating method may include, remitting, by the a remittance unit of the kiosk, the amount obtained through the selling of the cryptocurrency for currency exchange to an account of an operator who operates the member store in which the service providing device is installed (S750).

In this regard, the kiosk that provide blockchain-based financial services through the above-mentioned method may prevent cryptocurrency payment services or cryptocurrency exchange services from being performed by performing a circuit break when the drop in the market price of the cryptocurrency for currency exchange is greater than a preset reference.

In terms of implementing a kiosk that provides blockchain-based financial services according to one embodiment of the present disclosure, when the kiosk is embodied as an unmanned ATM without a user directly operating or the kiosk operates the kiosk on its own, to check the user's identity, a scanning procedure of an ID card or passport may be required. Such scanning procedures may be temporarily stored while financial services are performed. Thus, this procedure may mean a measure for preventing the use of cryptocurrency for unfair purposes (money laundering, etc.) or mean a procedure to secure information to resolve cases where cryptocurrency is used for improper purposes.

On the other hand, when the kiosk according to one embodiment of the present disclosure is embodied as a device used in a place such as an affiliated store with a user who operates the kiosk, a prepayment procedure may be required to ensure that costs are paid first for services using cryptocurrency. It may be obvious to a person skilled in the art that the scheme in which the kiosk is implemented and the procedures in which the scheme is applied may vary depending on the technical characteristics of the kiosk according to one embodiment of the present disclosure, and a detailed description thereof is omitted.

The embodiments of the present disclosure disclosed in this specification and drawings merely provide specific examples to easily describe the technical content of the present disclosure and aid understanding of the present disclosure, and are not intended to limit the scope of the present disclosure. In other words, it is obvious to those skilled in the art that other modifications based on the technical idea of the present disclosure may be implemented. Additionally, the above embodiments may be operated in combination with each other as needed. For example, all embodiments of the present disclosure may be implemented in a partially combined manner with each other and by the system 10, the server 20, the first terminal 30, and/or the second terminal 40 of the present disclosure.

Furthermore, the method of controlling the system 10, the server 20, the first terminal 30, and/or the second terminal 40 of the present disclosure may be implemented in the form of program instructions that may be executed through various computer means, and may be recorded on a computer-readable medium.

The various embodiments of the present disclosure may, in certain respects, be embodied using computer readable code on a computer readable recording medium. A computer-readable recording medium is any data storage device capable of storing data that may be read by a computer system. Examples of the computer readable recording media may include read only memory (ROM), random access memory (RAM), and compact disk-read only memory (CD-ROM). magnetic tapes, floppy disks, optical data storage devices, and carrier waves (data transmission via the Internet, etc.). The computer-readable recording media may also be distributed across networked computer systems, such that computer-readable code is stored and executed in a distributed scheme. Furthermore, functional programs, code, and code segments to achieve various embodiments of the present disclosure may be easily interpreted by programmers skilled in the field to which the present disclosure applies.

It will also be appreciated that the devices and methods according to various embodiments of the present disclosure may be realized in the form of hardware, software, or a combination of hardware and software. Such software may be stored on, for example, volatile or non-volatile storage devices such as ROM whether erasable or rewritable, or memory such as RAM, memory chips, devices or integrated circuits, or for example, may be stored in a storage medium that is optically or magnetically recordable, and readable by a machine (e.g., a computer), such as a compact disk (CD), DVD, magnetic disk, or magnetic tape. Methods according to various embodiments of the present disclosure may be implemented by a computer or mobile terminal including a control unit and memory, and such memory may be an example of a machine-readable storage medium suitable for storage of a program or programs including instructions implementing embodiments of the present disclosure.

Accordingly, the system of the present disclosure includes a program containing codes for implementing the device or method as described in the claims of the present disclosure and a machine (such as a computer)-readable storage medium storing such a program therein. Furthermore, such programs may be transmitted electronically through any medium, such as communication signals transmitted over a wired or wireless connection, and the scope of the present disclosure includes equivalents thereto, as appropriate.

The invention claimed is:

1. An integrated system for providing virtual services that operates in a network environment, the system comprising:
   a first terminal in which an online platform supporting a virtual service is executed; and
   a server for operating the online platform,
   wherein the server is configured to:
   receive first user information associated with the first terminal;
   receive a position information from a kiosk associated with the first terminal;
   perform an authentication procedure on the first user of the first terminal based on the first user information, the authentication procedure comprising:
   generating a first QR code based on the first user information and the position information,
   transmitting the first QR code to the first terminal;
   receive, from the kiosk, an access authentication request to access the virtual service on the first terminal based on the kiosk reading the first QR code from the first terminal;
   generate a second QR code based on a current location of the first terminal;
   transmit the second QR code to the kiosk and the first terminal;
   receive, from the kiosk, a comparison result of comparing a first overlay QR code and a second overlay QR code, the first overlay QR code being generated by the kiosk and the second overlay QR code being generated by the first terminal;
   transmit, to the first terminal, information for providing the virtual service on the first terminal, based on the comparison result.

2. The integrated system of claim 1, wherein the integrated system further comprises a second terminal in which the online platform is executed,
   wherein the virtual service includes a DeFi (Decentralized Finance) service,
   wherein the first terminal is configured to:
   transmit the first user information to the second terminal;
   receive blockchain-based encrypted information corresponding to the first user information from the second terminal; and
   decrypt the blockchain-based encrypted information.

3. The integrated system of claim 2, wherein the kiosk comprises an input module and an output module.

4. The integrated system of claim 3, wherein the virtual service further includes a currency exchange service,
   wherein the kiosk is configured to:
   collect an identification (ID) card of the first user captured through the input module; and
   analyze the identification card and determine whether to provide the currency exchange service, based on the analyzing result.

5. The integrated system of claim 4, wherein the kiosk is further configured to:
   apply an object extraction algorithm to the ID card to obtain object information; and
   determine whether to provide the currency exchange service, based on the object information.

6. The integrated system of claim 5,
   wherein the first terminal is configured to display the first QR code received from the server thereon,
   wherein the kiosk is further configured to determine whether access of the first user to a place in which the kiosk is installed is permitted, based on the first QR code displayed on the first terminal.

7. The integrated system of claim 6, wherein the kiosk further comprises a scanner for collecting the identification card,
   wherein the first user information comprises a mobile phone number of the first user and personal information of the first user.

8. The integrated system of claim 7, wherein the server is further configured to:
   when an access authentication request signal is received from the kiosk, request current location of the user terminal to the first terminal; and
   generate the second QR code based on the current location of the first terminal and a current standard time information;
   wherein the first terminal is configured to:
   generate the first overlay QR code based on the first QR code and the second QR code; and
   transmit the first overlay QR code to the kiosk,
   wherein the kiosk is configured to:
   generate the second overlay QR code based on the first QR code and the second QR code; and
   compare the first overlay QR code and the second overlay QR code with each other and determine whether access of the first user is permitted, based on the comparing result.

9. The integrated system of claim 8, wherein each of the first overlay QR code and the second overlay QR code is generated by positioning a position detection pattern of the first QR code and a position detection pattern of the second QR code on the same axis, and
   wherein the kiosk is further configured to:
   compare each cell of the first QR code and each cell of the second QR code with each other, and
   set an identical cell thereof as a black cell and a non-identical cell thereof as a white cell.

10. The integrated system of claim 9, wherein the integrated system further comprises a plurality of kiosks respectively installed in a plurality of preset specific locations,
   wherein the first terminal stores therein a plurality of first QR codes corresponding to the plurality of kiosks in a separate manner.

* * * * *